United States Patent [19]

Waks et al.

[11] 4,066,843
[45] Jan. 3, 1978

[54] TELEPHONE CIRCUIT MONITORING SYSTEM

[75] Inventors: David J. Waks, Princeton, N.J.; Adolf Futterweit, Lahaska, Pa.

[73] Assignee: Applied Data Research, Inc., Princeton, N.J.

[21] Appl. No.: 562,910

[22] Filed: Mar. 28, 1975

[51] Int. Cl.² ........................................... H04M 15/38
[52] U.S. Cl. .................................. 179/8 A; 179/7.1 R
[58] Field of Search ................. 179/175.2 R, 175.2 C, 179/7 R, 7 MM, 7.1 R, 7.1 TP, 8 R, 8 A, 9

[56] References Cited

U.S. PATENT DOCUMENTS

| | | | |
|---|---|---|---|
| 3,551,598 | 12/1970 | de Varda et al. | 179/7.1 R |
| 3,562,436 | 2/1971 | Lutgenau | 179/7.1 R |
| 3,651,269 | 3/1972 | Le Strat et al. | 179/7 R |
| 3,760,110 | 9/1973 | Joel, Jr. | 179/8 A |
| 3,825,689 | 7/1974 | Baichtal et al. | 179/8 R |
| 3,835,257 | 9/1974 | McLaughlin | 179/8 A |
| 3,852,533 | 12/1974 | Henrickson et al. | 179/8 A |
| 3,870,823 | 3/1975 | Gayler et al. | 179/7 MM |
| 3,925,623 | 12/1975 | Tysseland | 179/7 R |

Primary Examiner—Kathleen H. Claffy
Assistant Examiner—Gerald L. Brigance
Attorney, Agent, or Firm—Morton C. Jacobs

[57] ABSTRACT

A telephone circuit monitoring system includes sampling means for repeatedly sampling the bistate and linear (a-c and d-c) control signals concurrently on a plurality of trunk circuits. When any of the circuits go off-hook, a central control initiates the sampling operation and repeatedly directs the sampling of the linear signals and bistate signals of each of a plurality of off-hook circuits until the monitoring purpose has been served.

26 Claims, 13 Drawing Figures

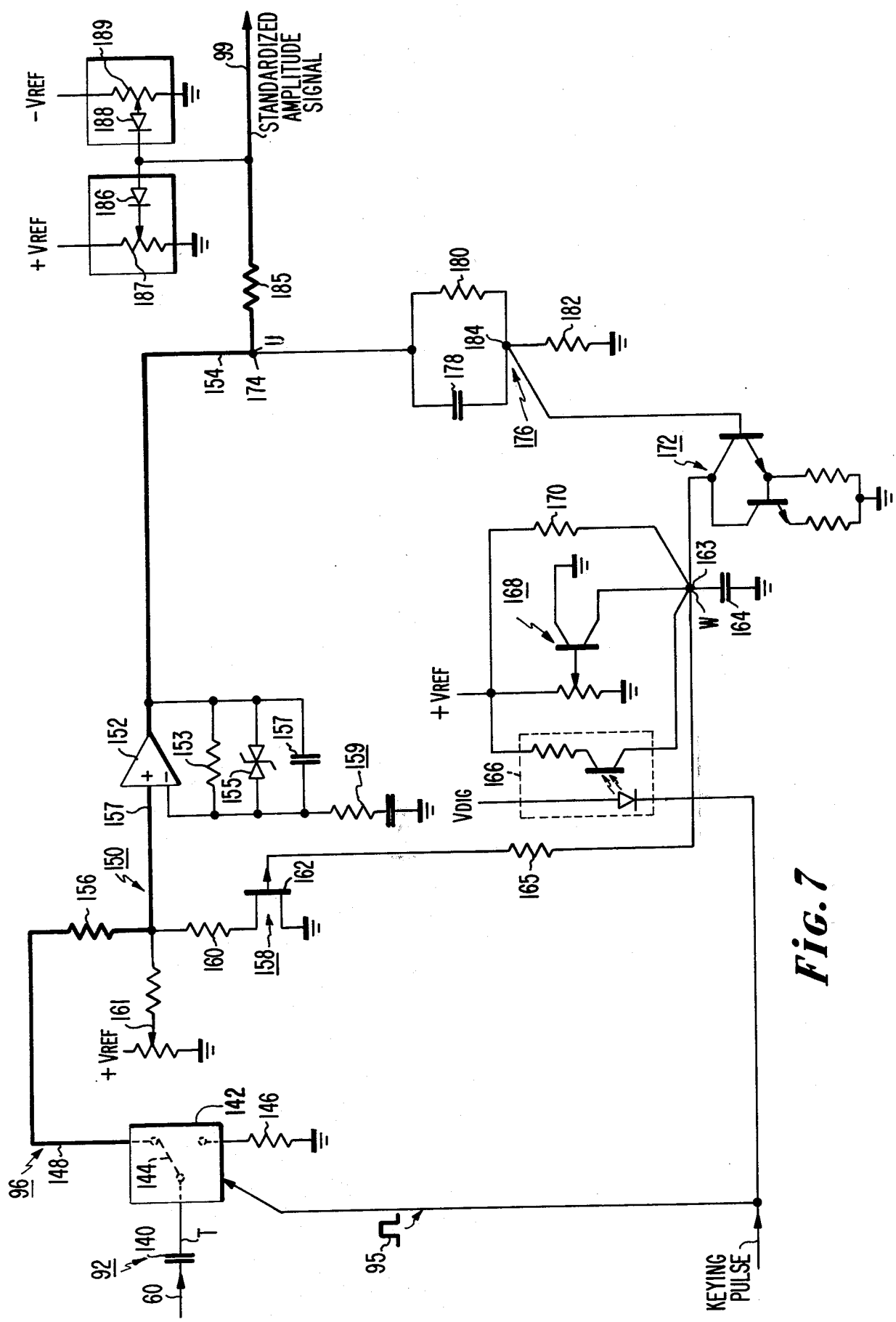

TELEPHONE CIRCUIT MONITORING SYSTEM

BACKGROUND OF THE INVENTION

This invention relates to telephone communications systems and particularly to systems for monitoring telephone circuits.

In the monitoring of telephone circuits, various control signals including addressing signals are detected and decoded. Thereby, the performance and/or efficiency of the telephone equipment and the network in which they are connected can be determined and faulty or improper operation identified for the purpose of improvement or correction. A description of a monitoring system for telephone lines used as a "Line Usage Measuring Circuit" is in the U.S. Pat. No. 3,829,618.

In prior art monitoring systems, the monitoring equipment detects when an observed telephone line is seized or an off-hook condition occurs and connects to the line for the purpose of obtaining the various control signals that occur, whereby the disposition of the call can be determined. When the disposition is determined, the monitoring equipment is freed to connect to the next seized line. A separate equipment of that type is needed for monitoring each of the telephone lines that are seized at any time, and, since the equipments can be costly, such systems have limited effectiveness.

SUMMARY OF THE INVENTION

Accordingly, it is among the objects of this invention to provide a new and improved telephone circuit monitoring system.

Another object is to provide a new and improved system for monitoring a plurality of telephone circuits at the same time.

Another object is to provide a new and improved equipment for monitoring the control signals occurring simultaneously on a plurality of telephone circuits.

In accordance with one embodiment of this invention, a telephone circuit monitoring system comprises separate inputs connected to each of the telephone circuits to be monitored for receiving the linear signals - both direct and alternating current signals—and the bistate signals occurring thereon. A linear sampling means and bistate sampling means in response to an address signal, converts the linear and bistate signals on the addressed telephone circuit to corresponding representative digital signals. A digital processor, in response to the representative digital signals, generates the address signals for directing the sampling means to the telephone circuits to be monitored.

Thus, in response to any one of the telephone circuits going off-hook, the digital processor generates the corresponding address signal for the sampling means. The latter samples the linear and bistate signals on the addressed telephone circuit and encodes them digitally and supplies the digital signals to the processor for processing and analysis. The processor, in this way maintains the monitoring of a plurality of telephone circuits that are off-hook and repeatedly directs the sampling of the linear and bistate signals of each of a plurality of off-hook circuits until it has received sufficient samples for its monitoring purpose, whereupon the monitoring ceases.

DETAILED DESCRIPTION OF THE INVENTION

The foregoing and other objects of this invention as well as the various features thereof, will be more readily understood from the following detailed description when read together with the accompanying drawing, in which:

FIG. 7 is a schematic circuit diagram of a portion of the a-c signal detector of FIG. 3;

In the drawing corresponding parts are referenced throughout by similar numerals.

Figure 1:
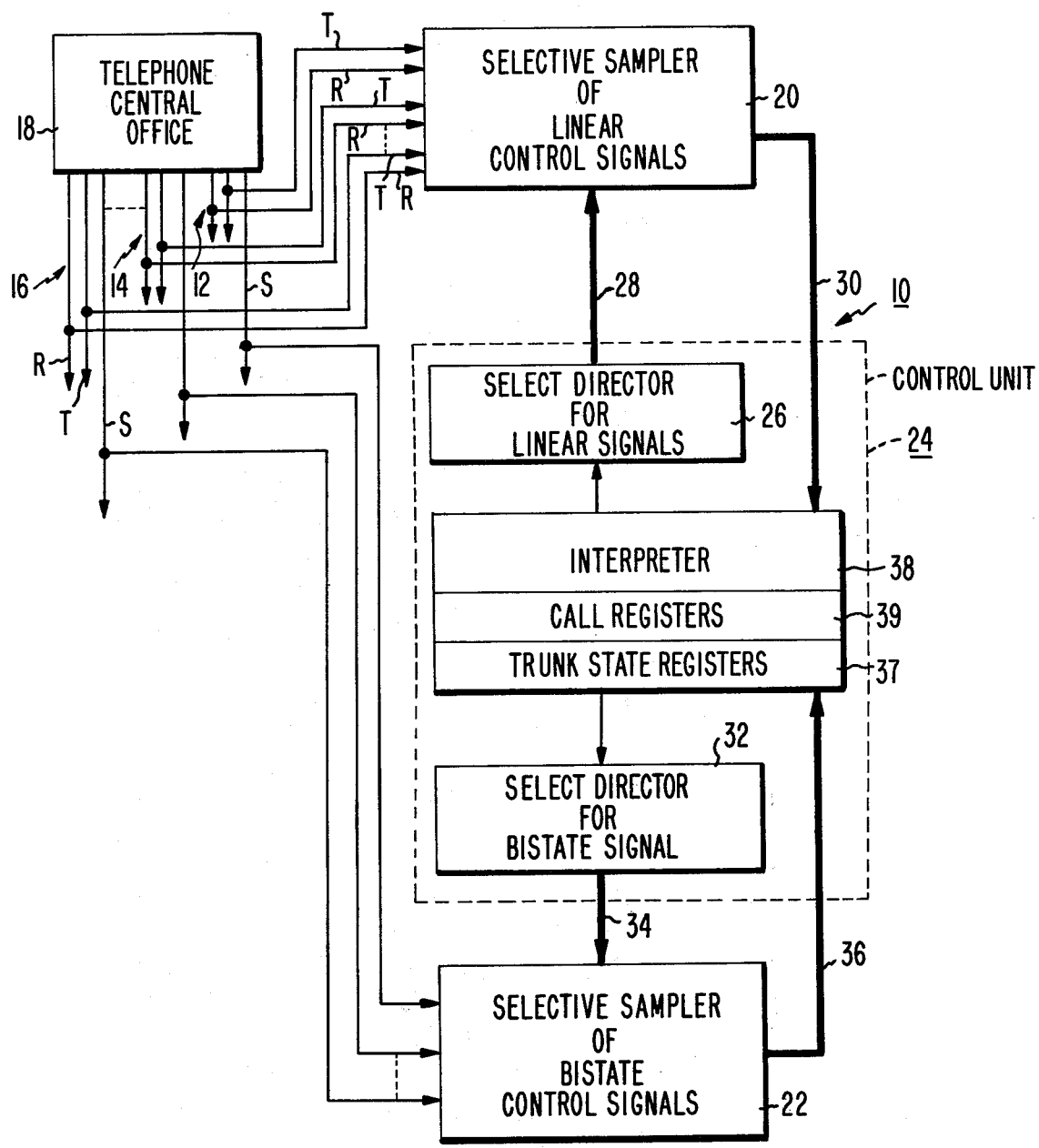
FIG. 1 is a schematic block diagram of a telephone monitoring system embodying this invention.

In FIG. 1, a telephone circuit monitoring system 10 is shown connected to a plurality of trunk lines 12, 14, 16 at a telephone central office 18. In the illustrated embodiment, each trunk line is composed of a tip (T) and ring (R) line. The invention may also be applied to subscriber lines and to interoffice communication systems in which the trunk lines are a duplex formed of two pairs of such tip and ring lines. These lines carry, in addition to the voice communication signals, various control signals, alternating current (a-c) and direct current signals (d-c). These two forms of control signals are called linear signals hereinafter. Associated with each of the trunks 12, 14, 16 is also a sleeve line (S), in this illustrative form of the invention, which carries bistate control signals; this invention is also applicable to other forms of telephone circuits (all of which are hereinafter called trunks), for example, to those in which the bistate control signals are carried by the two wires, E and M. Differences in construction and operation are discussed hereinafter.

The tip and ring pair, (T) and (R), of each trunk is connected as an input to a sampler 20, which is effective for selective sampling of the linear control signals that appear on the T and R lines. The sleeve lines (S) of all the trunks are connected as inputs to a sampler 22 which is effective for selective sampling of the bistate control signals that appear on the sleeve lines. A control unit 24 is used for controlling and directing the sampling operations performed by each sampler 20 and 22. The control unit 24 includes a director 26, which is effective for supplying address signals via lines 28 to the linear sampler 20 to direct the sampling of the linear signals appearing on any one of the trunks 12, 14, 16. The sampled signals are supplied via lines 30 to the control unit 24. Similarly, the latter includes a director 32 which supplies address signals to the bistate sampler 22 via lines 34 to selectively sample the bistate signals appearing on any one of the sleeve lines; the sampled bistate signals are transferred to the control unit 24 via lines 36. The control unit includes an interpreter portion 38, which includes a processor that is effective to interpret the sampled linear signals and sampled bistate control signals that are received via lines 30 and 36, respectively, and determining therefrom which of the trunks 12, 14, 16 is to be sampled for linear signals, and which is to be sampled for bistate signals, and supplies the appropriate address signals via the respective select lines 28 and 34. The interpreter 38 includes trunk state registers 37 for keeping track of the state of each trunk and call registers for storing information about calls whose control signals are being sampled and used for analysis of the disposition of the call. The number of call registers is much less than the number of trunks being monitored; two call registers and 32 trunks are assumed for this illustrative description. In addition, the interpreter 38 performs the operations of monitoring, including call analysis, that are called for by a particular system.

In operation, at some time when all trunk circuits are idle, each trunk state register 37 indicated that its associated trunk is idle, and the call registers 39 each carry an indicator for the idle state. The control unit 24, through the interpreter 38, on a repeated basis, at regular time intervals, looks for a line seizure signal (change of bistate voltage from on-hook to off-hook) on each sleeve. To do this, it directs the bistate select director 32 to supply the trunk address sequentially for each sleeve to sampler 22, which selects each of the addressed bistate inputs and samples the voltage thereon. The sampler 22 effectively gates the state (in a digital signal form) of each selected trunk sleeve (S) back to the control unit 24 for analysis by the interpreter 38. When a seizure occurs on one of the telephone circuits 12, 14, 16 this is indicated by the change in voltage on the associated sleeve lead, which is recognized by the interpreter 38 from the sampled voltage that is supplied to the control unit 24 via leads 36. The bistate sample of each trunk is stored by the interpreter 38 in the associated one of its trunk state registers 37, and the interpreter, by comparison of the currently sampled state with the previously registered state, determines the change from "on-hook" to "off-hook" to identify a new seizure and thereby a new call.

If a seizure occurs on trunk #5, the trunk state register 37 for trunk #5, which had previously indicated the circuit as being "idle", is now changed by the interpreter 38 to indicate that it is "seized." In addition, a counter in trunk state register #5 starts counting the duration of the seizure in order to record circuit usage. In the assumed initial condition, both call registers 39 are in the idle condition, so that one of these is available to follow the seizure; e.g., the interpreter chooses call register-1 to follow the new call. The call state indicator in the call register is changed from "idle" to "dialing", the trunk channel number, #5, is placed in the call register, and all other entries in the register are cleared. The interpreter operates to detect MF signaling (the multifrequency tones for the call number) on the T/R leads. This is done by periodically sending the address of the trunk #5 T/R pair through the interface of the select director 26 to the linear signal sampler 20 and receiving back the detected samples. This linear signal sampling is done during a different time period from that used to sample the bistate signals on the sleeves and is interspersed on a regular basis with the bistate signal sampling.

The detected signal samples from the linear sampler 20 include signals which indicate the presence of the six tones which constitute MF signaling. The interpreter, at some point in the monitoring analysis, identifies signals indicating the presence of 1,300 and 1,700 Hz; this tone pair constitutes the MF signal "KP", which indicates the start of a string of MF call digits. Call register-1 is supplied with a code signal for storage to indicate that MF pulsing (rather than dial pulsing) is being decoded, and that KP has been registered. Following the registry of KP, the interpreter recognizes signals which indicate the presence of other call number tones, e.g., 900 and 1,300 Hz, which represent the call digit 5. The call digit 5 is stored in the first dialed digit position of call register-1. In the same way, the succeeding digits of the call are successively stored in that call register. When an ST signal is recognized by the interpreter, indicating the end of dialing, the call state indicator code is changed from "dialing" to "dialing complete." From this point forward, until the completion of the call, the interpreter continues to sample the T/R leads (which carry the audible and other d-c control signals). In other types of telephone circuits, the interpreter is constructed to direct the sampling to the particular leads carrying the control signals at each point in the normal sequence of control.

When the interpreter recognizes a signal from the linear sampler 20 indicating the presence of signal energy in the 300 to 900 Hz band, the interpreter uses positions in call register-1 to time the presence and absence of signals in this band. For example, the presence of repetitive signals approximating ½ second the of such signals followed by ½ second of quiet are detected and registered as busy signals. Repetitive signals of 2 seconds of such signals followed by 4 seconds of quiet are registered as ring cycles.

Analysis of a call can be terminated in a number of different ways. Continuing the example, the call may go to completion, represented by a reverse on-hook to off-hook bistate signal on the T/R pair. The disposition of the call is then registered as "complete", and the analysis and other monitoring of the call is terminated. An alternative is that the subscriber hangs up before the call is completed; this is indicated by the sleeve lead transitioning from "off-hook" to "on-hook" without a prior answer supervision on the T/R pair. In this case, the interpreter must further analyze the data registered in call register-1 to determine the disposition of the call. If a number of busy signals have been registered sufficient to account for the length of the call, the disposition is given as "busy." If the number of ring cycles accounts for the call, and a ring cycle was detected soon before the loss of seizure on the sleeve. The disposition is given as "no answer." If ringing had been detected, but not shortly before the loss of seizure, the disposition is given as "no supervision." The analysis of other dispositions are also made by logical comparisons of the registered control signal samples and their sequential relationships. Once the disposition has been determined and recorded by the interpreter (e.g., on an appropriate output device, such as a printer) the call register-1 is changed to "idle" and is then available for use or analysis of another call.

The interpreter continues to track the bistate signals of all trunks while call register-1 is following the call on trunk #5; thereby, all trunk state registers are continuously maintained up-to-date. During the course of analysis of the call on trunk #5, as described above, another seizure would be detected by the interpreter, e.g., on trunk #13. Since call register-2 is idle, it is used by the interpreter to analyze the call on trunk #13, as described above, by changing its state from "idle" to "dialing" and by recording #13 as the trunk number. Thereby, the interpreter sets up the control conditions for simultaneously analyzing two calls, using call register-1 to track the call on trunk #5 and call register-2 to track the call on trunk #13. To accomplish this simultaneous analysis of two calls, the interpreter directs the sampler 20 to sample the linear signals on both of these trunks. This operation, in one form of the invention, is performed on a time division multiplex basis. For example, at some point dialing may be proceeding simultaneously on both trunks. The interpreter alternately transmits the address of the T/R pair of trunk #5 and that of trunk #13 to sampler 20, distinguishing in the responses by registering which trunk was last addressed, and storing the resulting digits accordingly in call register-1 or call register-2. The sampling circuitry is constructed to adapt rapidly to the signal switching to develop representative signal samples for the widely different conditions existing on the different trunks. Dialing can be sampled for one call register, for example, while audible signal analysis is being performed for the other; the interpreter appropriately switches the sampling to the proper trunk according to the progress of the call, with the sampling of one trunk being unaffected by that on the other.

Where there are only two call registers, and simultaneous analysis is being performed as described above for trunks #5 and #13, seizure may occur on a third trunk, e.g., #18. In this case, with no call register available, the trunk state register 37 for trunk #18 is marked to indicate that a new seizure has occurred, and the call is timed in order to measure circuit usage; but the call is not analyzed for its disposition. This invention is not limited to any particular number of call registers; the number chosen for a specific telephone network will vary with the number of trunks, the amount of traffic and the requirement in the monitoring system for a higher or lower percentage of calls that are to be monitored with analysis of disposition of the call.

The two sampling operations performed by the linear sampler 20 and bistate sampler 22 are performed repeatedly on a regular basis; for example, in one embodiment, the bistate scanning is repeated for each trunk about every 50 milliseconds (ms) and completed in a few milliseconds, while the linear sampling is repeated about every millisecond and performed in a fraction of a millisecond. However, as described below in greater detail in connection with FIG. 11, after the linear sampling address is sent, a number of sampling operations are performed in about 10 to 20 ms at that same address until the end of that period. Each call register 39 is used to register the linear signals of a previous sample for comparison with those of the current sample. If these successive signal samples are the same, they are treated as stable signals and used for analysis by the interpreter 38; if not stable, the currently sampled signals are compared with the succeeding sample, and so on, until they are the same.

The monitoring operation performed by the interpreter may include that of determining the dispositions of all sampled calls from an analysis of the patterns of control signals that appear on the trunk lines and to prepare an output report thereof that is printed out at an appropriate time on the interpreter's output printer.

This invention is also applicable to other types of telephone circuits such as those of two-wire or four-wire circuits with "E" and "M" signaling. In the four-wire telephone circuit each trunk consists of two pairs of voice frequency leads, called "T/R" and "$T_1/R_1$", and two bistate leads called E and M. The voice frequency leads carry the telephone conversations, audible signals (such as ringing and busy) and the call address tones used in multifrequency signaling. The bistate leads carry seizure in both directions, answer supervision and dial pulsing. The two T/R pairs for each trunk are handled by the linear sampler 20, and each such pair has its own individual address so that it can be individually selected by the interpreter. Similarly, the E and M pair for each trunk is connected to the bistate sampler 22, and each such lead is individually addressed by the interpreter. The operation of the system with such telephone circuits is similar to that described above, but with certain modifications based upon which control signals are carried by the different signal lines. For example, if an incoming seizure occurs on one of the circuits, the interpreter will store the information that the seizure occurred on the E lead and will proceed to direct the detection of MF signaling on the $T_1/R_1$ leads by sending their address to the sampler 20. After the dialing-complete state is reached, the interpreter will send the address for the T/R leads of that trunk to carry the audible control signals that would occur thereafter. In a case where a subscriber hangs up before the call is completed, the interpreter would recognize this condition from its continuous sampling of the E and M leads, for the E lead would go from off-hook to on-hook without answer supervision on the M lead. The interpreter would discriminate between incoming and outgoing seizures by the location of the bistate signals and would correspondingly discriminate in its search on the $T_1/R_1$ pair in the other. By means of the above-described techniques and those described hereinafter, the interpreter is constructed to analyze the sampled control signals and determine the disposition of the calls in the various types of telephone circuits.

Figure 2:
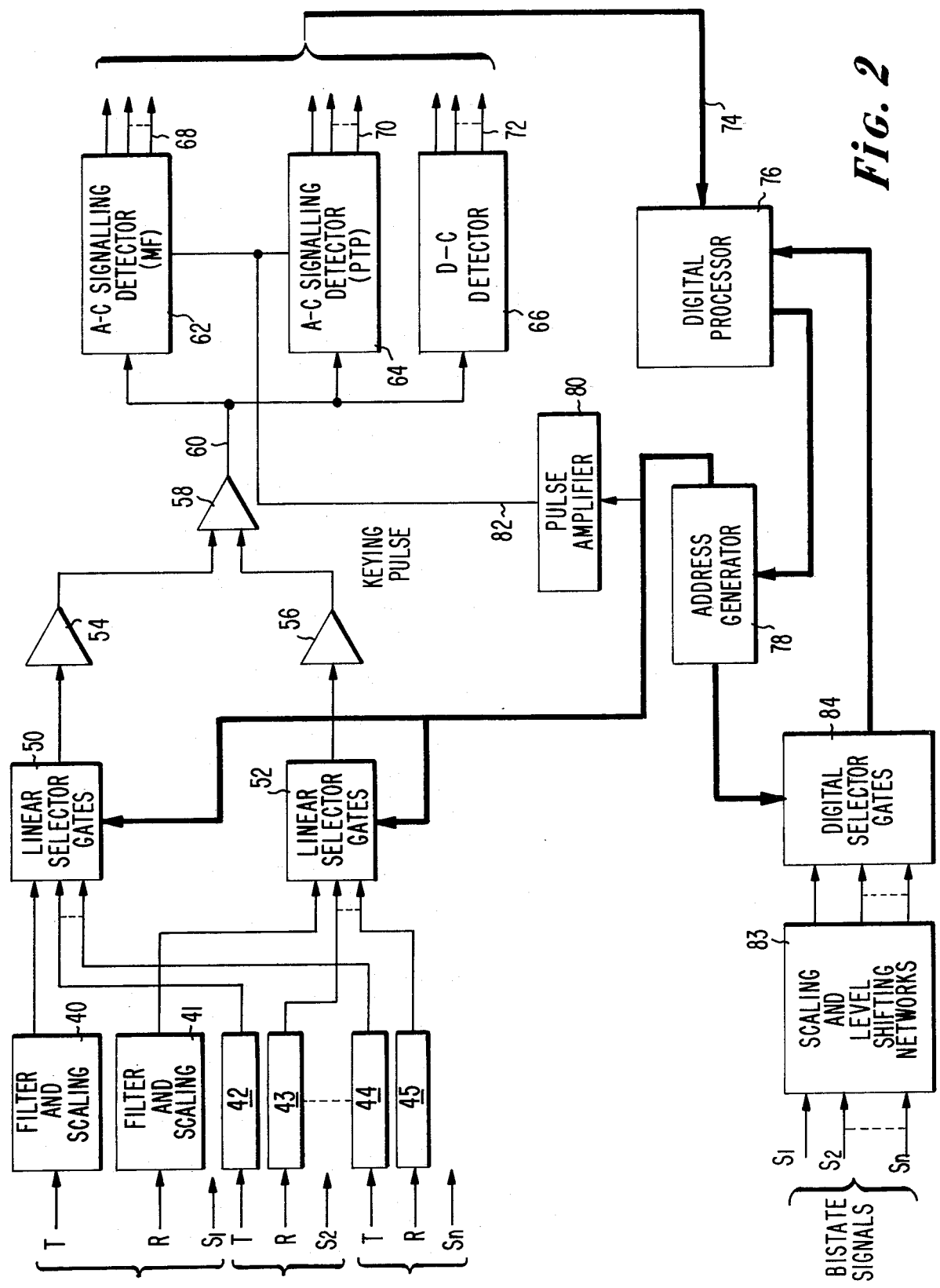
FIG. 2 is a schematic block diagram of the selective sampler for linear control signals of the monitoring system of FIG. 1 and the select director therefor.

A block diagram of the linear sampler 20 is shown in FIG. 2. The tip lines of each trunk 12, 14, 16 are connected to separate filter and scaling circuits 40, 42, 44, and the ring lines are connected to similar circuits 41, 43, 45. Each of the filter and scaling circuits also provides overload protection for its individual tip or ring line. These circuits have been suitably formed with a pad of scaling resistors, a capacitor to short out fast transients and a zener diode to ground for limiting the signal amplitude that is applied to subsequent circuits. The outputs of all the tip filters 40, 42, 44 are supplied to a tip linear selector 50; correspondingly, the outputs of the ring filters 41, 43, 45 are supplied to a ring linear selector 52. These selectors 50 and 52 are analog-gating circuits suitable for passing the linear signals on the tip and ring lines after scaling and filtering. These selectors receive a digital-gating address from an address generator 78 (which forms part of the selector directors 26 and 32); in one embodiment in which 32 trunk lines 12, 14, 16 are monitored, the digital address is a five-bit combinatorial signal. The linear selectors 50 and 52 decode the address signal and enable one of the gates in each selector 50 and 52 to pass the linear signals occurring on the corresponding tip and ring lines associated with that address. Thus, the outputs of the linear selectors 50 and 52 are the tip and ring signals from the addressed trunk, and these signals are passed by individual buffer amplifier and filter circuits 54 and 56 to a differential amplifier 58. The latter, which preferably includes a filter circuit, converts the two signals to a single-ended form on output line 60; thereby the signal on line 60 represents the difference between the tip and ring voltages. A suitable analog gate that has been used is the chip AM-3705 CD of National Semiconductor Corp., which has eight analog inputs and one analog output with four digital gating inputs. Operational amplifiers are used for amplifiers 54, 56, 58 and band-pass limiting capacitors are inserted in the feedback loop for filtering out noise.

The line 60, which carries the sampled linear signal in single-ended form, is connected to the inputs of three detector circuits 62, 64, 66. These detector circuits have individual differences in construction based upon the particular signal frequencies that are to be handled and detected therein. The detector 62 serves to detect about six or eight multi-frequencies corresponding to the call address on the trunk lines (or the touch-tone frequencies on a subscriber's PBX circuit); the PTP detector 64 is used for detecting two different audible signalling tones of lower frequency and lower amplitude, consequently, the PTP detector is more finely tuned than the MF detector 62, but is generally constructed with the same circuit configurations. Other factors involved in the design of these detector circuits is the band width of frequencies to be detected and the in-band signal strength at which detection is to take place. Detector 66 is used for detecting the direct voltages (battery and floating line voltages) appearing between the tip and ring lines of each trunk.

The outputs of each of the detectors 62, 64, 66 is in the form of a combinatorial digital signal representative of the linear difference signals that it receives as an input, which in turn is a representative sample of the control signals on one of the trunks. The outputs 68, 70, 72, respectively, for these detectors are supplied via line 74 to a digital processor, which in one form of the invention is a special-purpose computer for directing the operations of analysis and overall system control required of the interpreter 38, and also for producing special output reports of the quantity of the calls that were initiated and of their dispositions.

The digital processor 76 supplies signals regularly and repeatedly to the address generator 78 to direct the selection of the particular trunk circuit whose linear signals are to be sampled at any instant. The address generator 78 in turn supplies the address signals to the selector gates 50 and 52 to complete the sampling operation. In addition, pulse amplifier 80 is actuated by the address signals from generator 78 when an address is supplied to the selector gates, and this amplifier 80 supplies a keying pulse on line 82 for re-setting the a-c detectors 62 and 64 upon the initiation of a new sampling operation.

The address generator 78 also supplies on a repeated periodic basis successive addresses to the bistate sampler which is in the form of digital selector gates 84, and each of the latter separately receives the individual sleeve (or other bistate) line for a different one of the trunk circuits 12, 14, 16. The bistate signal for the addressed trunk circuit is passed by the associated one of the selector gates 84 and supplied to the digital processor 76. Individual scaling and level-shifting networks 83 receive the sleeve inputs and pass them to the selector gates 84. The latter are digital gates, one for each line, which are enabled by the address supplied by generator 78.

Scanning of the bistate signals on the sleeve lines of the trunk circuits is performed by repeated addressing of the digital selector gates 84 in sequence. When there is a change in state of any particular sleeve signal corresponding to a change from on-hook to off-hook (as determined by comparison of the current sample with the previous sample stored in the trunk state register 37), the digital processor 76 registers that change in the call registers 39 as the initiation of a call. Generally, because of the time required for the linear sampling circuitry to arrive at a stable detection of the audio frequency signals, only a limited number of the detected calls can be monitored fully. The call registers 39 are therefore limited in number; accordingly, the processor 76 first determines if there is a free call register before assigning thereto a new call for full sampling and monitoring. It has been found that with an embodiment of this invention using two call registers a substantial number of trunk circuits (e.g., 32 trunks) can be handled and more than half of the calls during a busy part of the day can be fully sampled and monitored. Thereafter, the processor initiates a sampling operation of the linear control signals for the new call multiplexed with the sampling of any other trunk having a call set up in one of the call registers 39.

The operation of a tip and ring pair is as follows: A small differential a-c signal between the pair of wires is used to convey audio signals for ringing, busy, reorder, and MF (multi-frequency) address signals. The tip and ring pair also conveys control signals by d-c formed between the tip and ring lines. These signals determine whether the far end has answered, the rotary dial information, a recorded message in process, and the on-hook and off-hook signals for two-wire circuits. The signals of the telephone company are in the 50-volt domain, together with noise, such as atmospherics, and sampling problems arise when the d-c levels occur. Any change in the d-c levels can seriously impair a sample of the a-c control signals. Therefore, a base line is provided for the sampled signal that is being taken, and this base line is independent of the d-c levels that are normally applied to the tip and ring pair, in order for the sampling operation to be effective.

The d-c control signals are scaled in the ± 10-volt domain (i.e., down from the range of 0 to 50 volts). The a-c range is ± 2 to ± 200 millivolts. The functions for the linear sampler 20 are as follows: inhibit noise; scale the signals proportionately; and separate the a-c and d-c signals, with the a-c amplitude being about ± 8 millivolts and the d-c level of 10 volts separated from the a-c; convert the different signals to single-ended form; and initialize each sample by a keying signal which is a pulse of 12 milliseconds. The sampling takes place over a maximum period of 20 milliseconds and a minimum of about 10 ms, and the integrity of the measurement must be assured in that time period or less.

In order to get a base line, it is necessary to initialise or reset the detecting circuits, to insure uniformity in the sampled signals that have to be normalized, from which they can be digitized. A digital processor is used to determine on a statistical basis whether the sampled information is self-consistent with the preceding samples and therefore reliable enough for use. Because of this sampling operation, the circuitry is constructed to accept small samples which have to be independently processed without relation to the immediately preceding sampling which may come from another trunk. That is, there is no historical reference for each sample which can be used to provide a base line, or other reference for the signal being monitored. Ultimately, the historical reference is provided in the digital processor, where successive samples from the same trunk are compared for consistency and change, and thereafter, if valid and stable, used for analysis.

Figure 3:
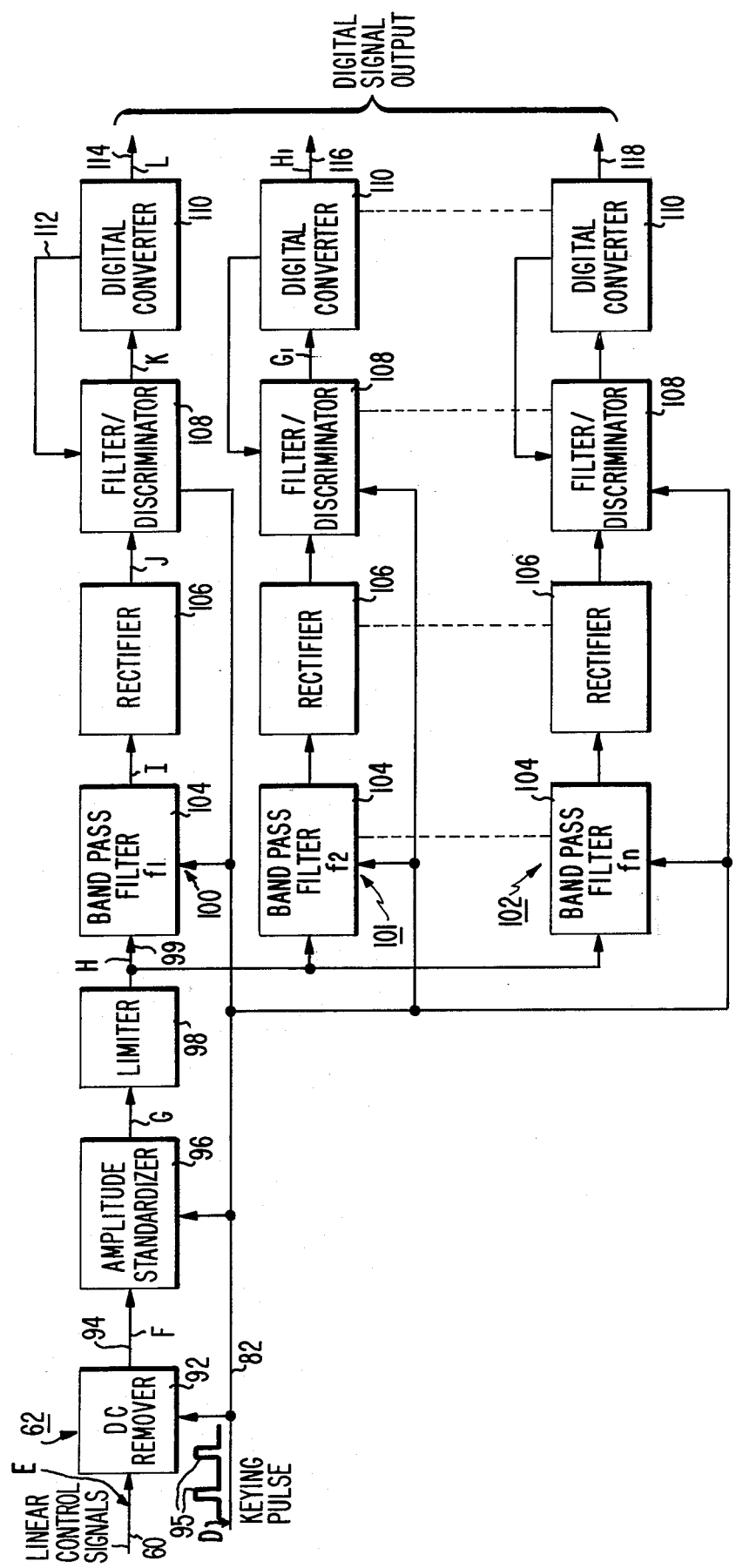
FIG. 3 is a schematic block diagram of an a-c signal detector employed in the sampler of FIG. 2.
Figure 5A:
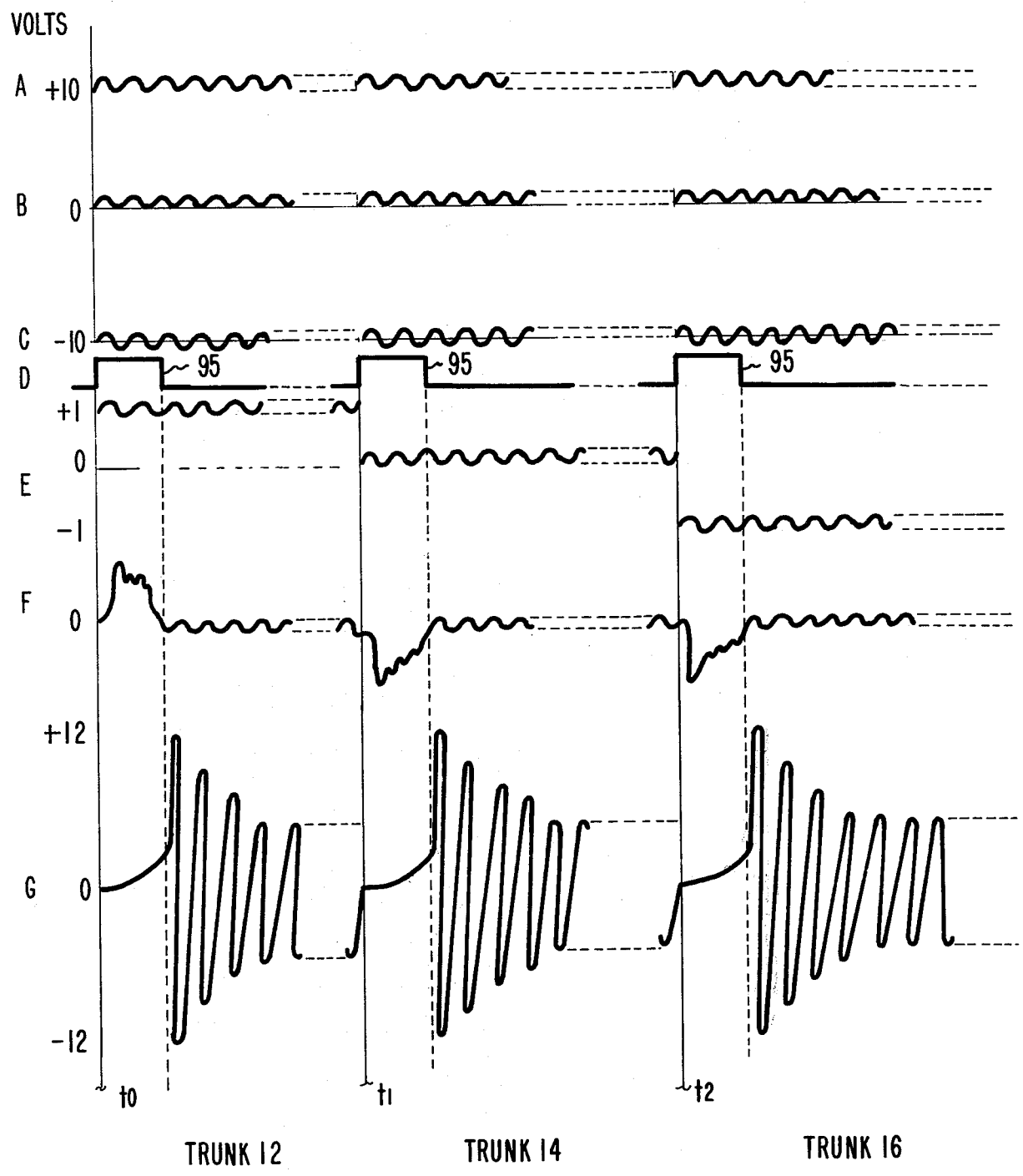
FIGS. 5a and 5b are a set of idealized waveform diagrams showing the forms of signals occurring in various parts of the detector of FIG. 3 and the circuit of FIG. 8.
Figure 5B:
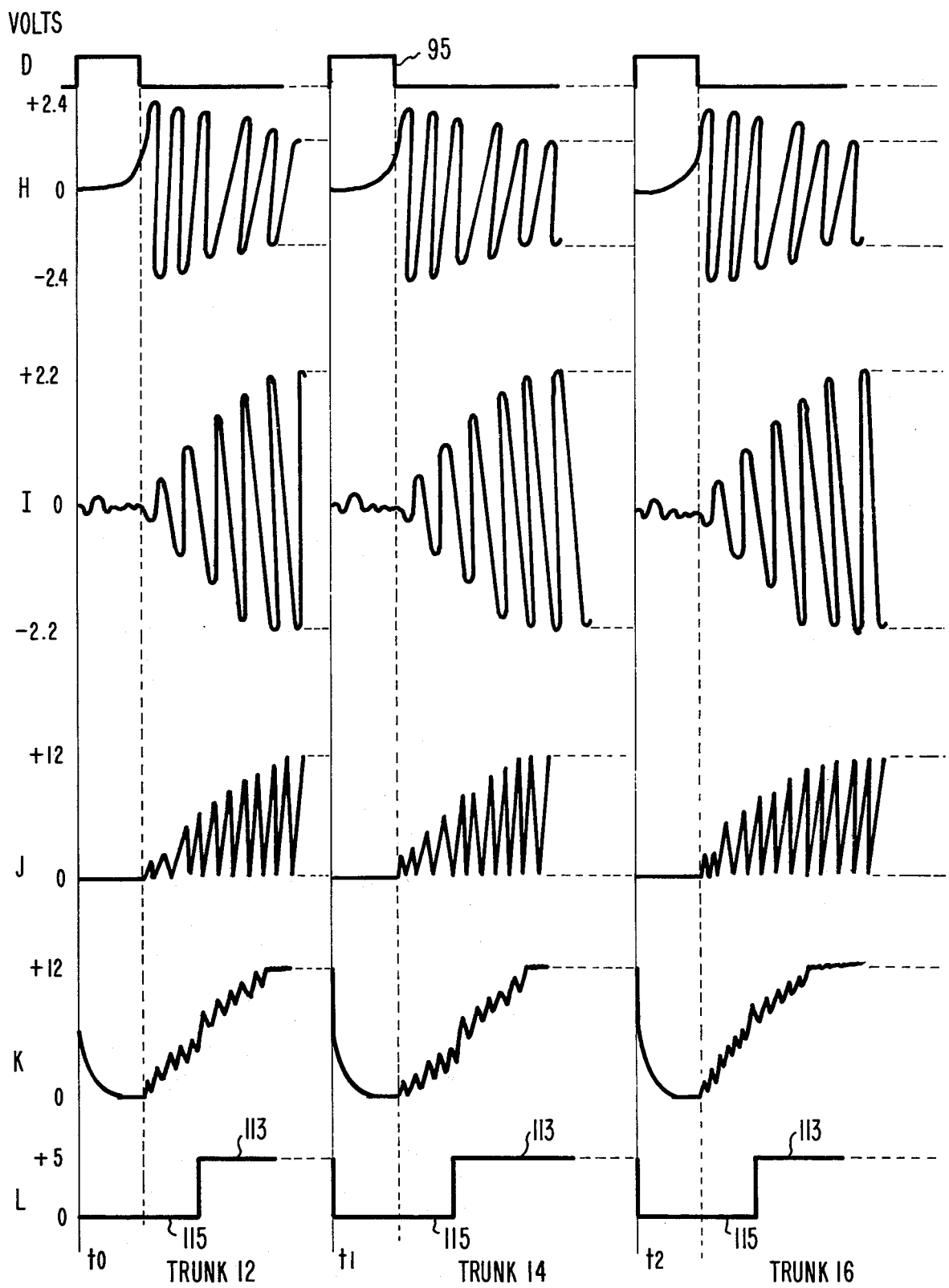

Shown in FIGS. 5a and 5b is a waveform diagram, which illustrates the waveforms occurring on various portions of the frequency detector of FIG. 3, and the processing of sampled signals in the time-division multiplexing of three trunks 12, 14, 16. In the first three lines of FIG. 5, (lines A, B and C) are the typical ripple or a-c signals that are respectively sampled from the T and R lines of the three trunks substantially concurrently. Lines A, B and C in FIG. 5 represent the different direct voltage levels occurring on the T and R lines of the three trunks: on trunk 12, it is assumed, there would be a d-c differential level of about 10 volts; on trunk 14, a d-c level of close to 0 volts; and on truck 16, a d-c level of about −10 volts. These different d-c levels may be due to a number of control factors, and their detection and analysis is handled in the d-c detector 66.

Figure 6A:
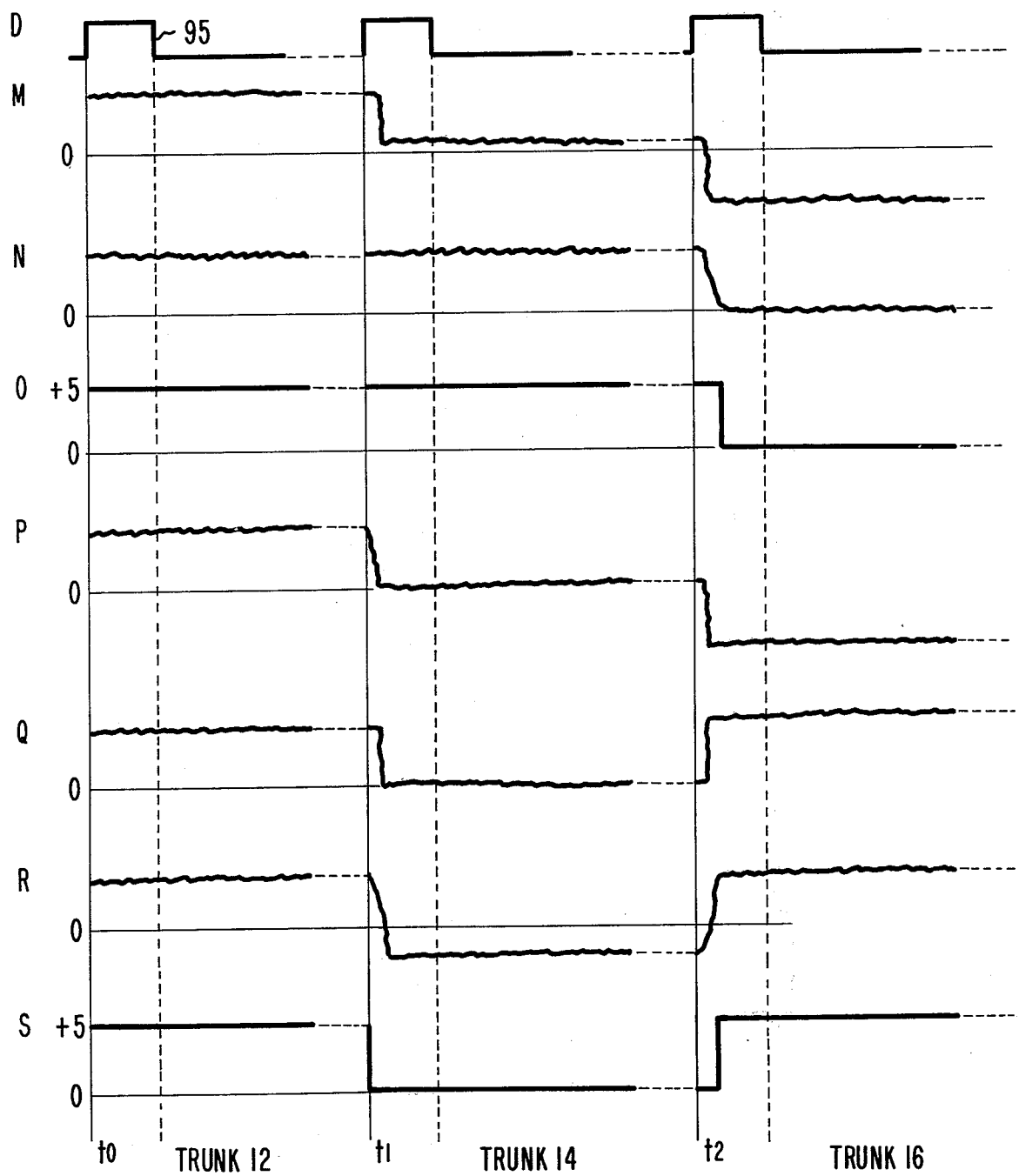
FIGS. 6a and 6b are sets of idealized waveform diagrams respectively showing the forms of signals occurring in various parts of the detector of FIG. 4 and the circuit of FIG. 7.
Figure 6B:
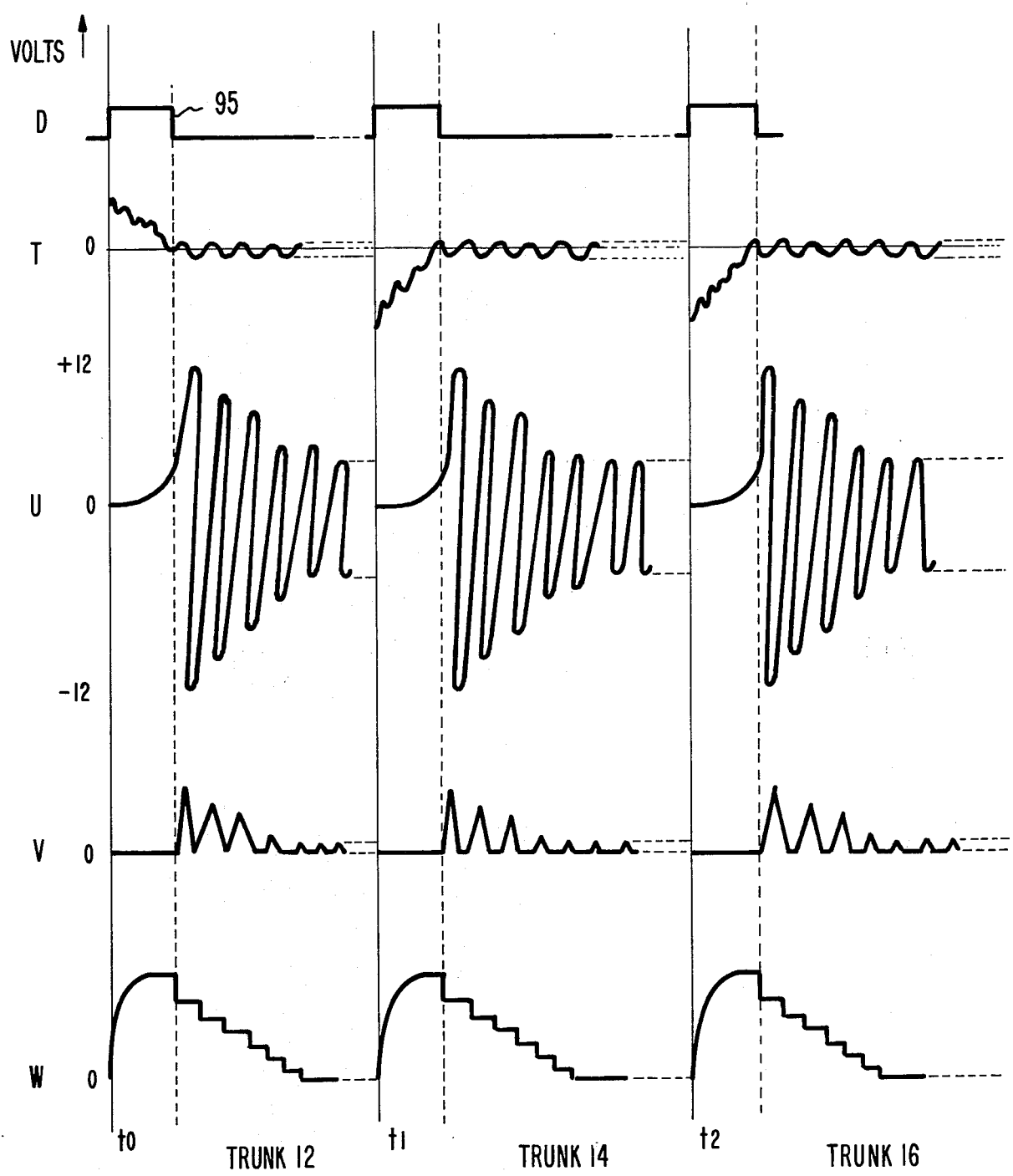

In line E, the waveforms are those that are supplied as linear signal inputs to the frequency detector 62 as they occur on line 60 for the three different trunks after being gated successively through the multiplexing gates 50 and 52, and after the T and R differential voltage is obtained by amplifier 58. In line E, the remaining direct voltage differentials after the tip and ring signals have passed through the difference amplifier 58 may be due to a number of causes, such as the random differences in direct voltages occurring on different trunk lines due to different control states. Thus, during a first illustrative sampling period when the trunk circuit 12 is being sampled, the a-c ripple has approximately a +1 volt d-c level; during a second sampling period when trunk circuit 14 is being sampled, the d-c level is slightly positive, close to 0 volts, and during the third successive sampling period, the d-c level is assumed to be about −1 volt. These three variations indicate a typical range of variations that occur under the assumed illustrative circumstances. The keying pulse 95 applied to line 82 is shown on line D, and its relation to the concurrent and subsequent waveforms indicated. The MF frequency detector 62 (FIG. 3) has as its front end a circuit 92 for removal of the d-c and for supplying an output signal (line F, FIG. 5a) on line 94 which is the remaining ripple a-c signal; circuit 92 is keyed by pulse 95 on line 82. From the waveform on line F, it is apparent that the d-c removal circuit 92 has the effect of removing these differences in direct voltage level and placing all of the a-c ripple signals on the same 0 volt base line. The broken line at the beginning of each sampling period represents the period over which the digital keying pulse 95 is applied, and as indicated by the resulting varying waveforms, represents the condition of the various circuits being restored to an initial condition for the sample from each trunk. The waveforms of FIGS. 5 and 6 serve to illustrate transients due to gating and keying at the beginning of each sample. Waveforms omitted in the later half of the sample period are shown by the broken lines to continue generally in the same forms and amplitudes as the last full line portion.

The signals with the d-c removed, are applied to an amplitude standardization circuit 96 (which is likewise initialized by the keying pulse 95) and operates to standardize (line G) the amplitude of the a-c signal that it receives. The changes in the signals with changes in sampling from one trunk to another and the following initializing operation produces large transients in the first several cycles of the a-c, and the following overvoltage limiting circuit 98 inhibits these large transient over-shoots that occur during the initialization. During normal operation, the audio signal levels are slightly below the limiter threshold and therefore are unaffected by the limiter circuit 98, so that the limited signal 99 takes the form shown in line H.

The standardized audio control signals on line 99 are applied to a plurality of separate channels 100, 101, 102, each of which is tuned to a different band-pass frequency. The number of channels is dependent upon the particular number of individual frequencies used as control signals and to be detected. For the MF detector, six such frequencies are employed; for a touch-tone (TTMF) detector for individual address tone signals eight such signals are used for the corresponding frequencies; and for the PTP detector, two low frequency signals are detected in separate channels. The initial band-pass filter 104 of each channel is tuned to the prescribed frequency and has adjustments for amplitude and bandwidth. These filters are all initialized by the keying pulse 95. The audio signals passed by the filters (line I) are rectified in a full-wave rectifier 106, and the rectified signals (line J) are supplied to a low pass filter and discriminator 108. This circuit works in conjunction with a digital transducer 110 with the output (line K) of the discriminator 108 being provided as the input to the transducer 110, and with a feedback path 112 from the transducer 110 to the filter-discriminator 108.

The filter-discriminator has an a-c hysteresis characteristic, and its analysis is initiated by the keying pulse. The resulting signal from the transducer 110, which is essentially a level-crossing detector, is a digital signal (line L) of either of two different amplitudes: one amplitude 113 corresponds to the presence of a substantial energy level of the channel frequency and the other amplitude 115 to a negligible energy level of that channel frequency (in line L of FIG. 5, all three trunks are assumed to have audio signals of the channel frequency). When the detector energy in the channel of interest has a particular level, the output circuit changes from one binary state (e.g., 0) to the other (1). Each channel 100, 101, 102 supplies a different binary output 114, 116, 118 with a digital signal representative of the energy level in the sampled trunk a-c. The combination of six (or eight) digital output signals represents the combination of MF frequencies (or touch-tone frequencies) that exist or do not exist on the trunk lines at any sampling time.

Figure 4:
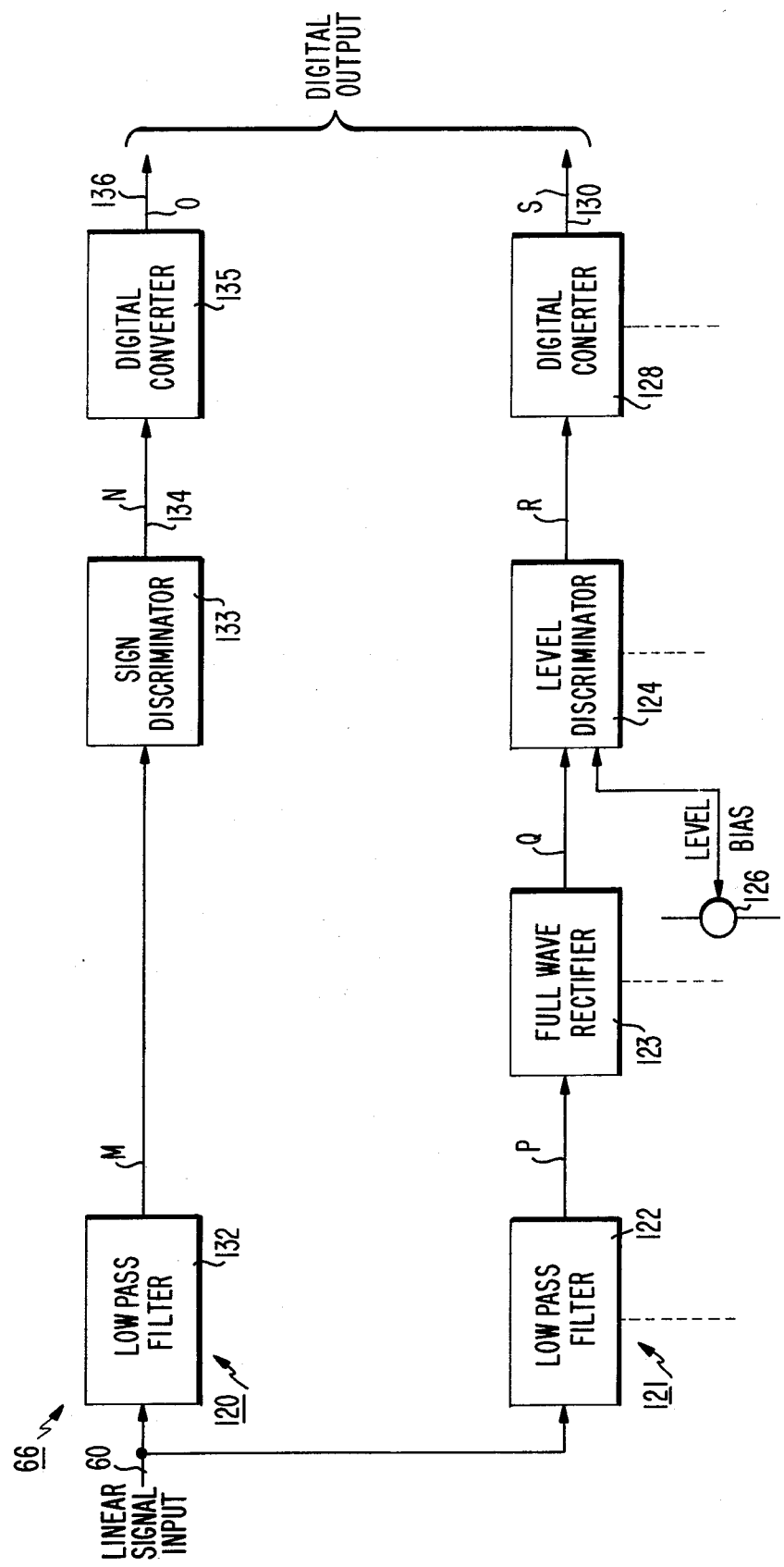
FIG. 4 is a schematic block diagram of a d-c signaldetector employed in the sampler of FIG. 2.

The d-c detector has a plurality of channels 120, 121 each of which operates on the d-c bias in the linear audio signal (line E of FIG. 5). A low pass filter 122 in channel 121 removes the ripple of the a-c signal that rides on the d-c bias; the resultant signal is shown in line P of FIG. 6a. A full wave rectifier is used to develop a single polarity signal (line Q) which is compared in a level discriminator 124 with a direct voltage from a level selector control 126 such as a potentiometer. The output (line R) of the discriminator is digitized in a transducer 128 to produce a binary signal (line S) on output 130 which is high (1) if the threshold amplitude is exceeded and otherwise is low (0). A plurality of channels, such as channel 121 (as indicated by the borken lines in FIG. 4), each having a different threshold level 126, may be used so as to quantify the d-c control signal component in the linear signal. In the other channel 120, the signal (line M) passed by a low pass filter 132 is processed in a sign discriminator 133, which is similar to circuit of the level discriminator 124. The latter is an operational amplifier with a zener diode or other non-linear feedback and a substantial bias opposing the input. When the latter exceeds the bias voltage, the amplifier tends to be driven toward saturation and its output is clamped by the non-linear feedback. The sign discriminator 133 is the same circuit without the offset bias, so that it responds to signals deviating either side from the base line of zero volts to produce a binary output (line N) representative of the polarity of the input. This output is digitized in transducer 135 to produce a digital signal in binary form on output 156 (line 0) that depends upon the polarity of the bias in the audio signal.

The d-c removal circuit 92 that receives the linear signal input on line 60, in one form of the invention is shown in FIG. 7 and comprises a series blocking capacitor 140 which rejects the d-c signals within the sampled linear control signals and passes the a-c signals. The latter are supplied to an electronic relay 142, shown diagrammatically in FIG. 7 as a single-pole double-throw mechanical switch 144 that is operated under control of the relay in response to the initializing keying pulse 95. During the pulse 95 the switch connects capacitor 140 via a fast charge impedance 146 to ground. After termination of the pulse 95, the relay restores switch 144 to its normal position, so as to provide a connection via line 148 for the sampled a-c signal to the amplitude standardization circuit 96. During the keying pulse, the charge impedance 146 provides the required RC time constant for charging capacitor 140 during the 2 ms period of the keying pulse. Thereby the keying pulse is effective to actuate a fast charge circuit for removing whatever d-c bias voltage exists on the capacitor 140 at the instant of the keying pulse. As shown in the waveform diagram of FIG. 6, line T, a big voltage step takes place, either positive or negative, between successive samples. This step corresponds to the total difference of d-c bias between the two trunks, i.e., the d-c potential change as the sample terminates for one channel and begins on another. Thus, the d-c bias existing between two trunks is effectively combined at the beginning of the keying pulse as the sampling gate for one trunk closes and that to another opens. The operation of the electronic relay 142 removes this combined d-c bias at the start of a sampling cycle.

Upon termination of the keying pulse, the complex a-c control signals of the sample are processed by the amplitude standardization circuit 96. This circuit is primarily an automatic gain control (AGC) circuit. The a-c signal from the d-c removal circuit is supplied via line 148 through a voltage divider attenuator network 150 to the operational amplifier 152 of the AGC circuit. The output of the operational amplifier 152 on line 154 is the standardized a-c signal. The voltage divider network 150 is made up of a fixed resistive attenuator 156 and a variable attenuator 158 including resistor 160 and a FET transistor 162 whose variable impedance is effective to control the variable attenuation ratio. The control voltage for the FET 162 is supplied via resistor 165 from an integrating capacitor 164. The voltage (line W) of the latter, in turn, is controlled by four different sources. An opti-isolator circuit 166 drives the attenuator to minimum attenuation during the keying pulse 95 which is applied to the input of the isolator circuit 166. The isolator output provides the appropriate fast-charging or low impedance during the keying pulse 95 for modifying the voltage on integrating capacitor 164 and thereby the control voltage for the FET 162 so as to reduce to the minimum the attenuation of the input a-c voltage to the operational amplifier 152.

The second controlling source for capacitor 164 is a limiter circuit 168 (a transistor whose charge impedance is set by a potentiometer adjustment) which is effective to keep the voltages at the capacitor 164 within the range of the operating characteristic of the FET 162. A high bleed resistor 170, the third source, tends to constantly charge capacitor 164, thereby to drive the AGC circuit slowly but steadily toward a high gain condition. The damping action of the AGC circuit is by means of the feedback amplifier 172, the fourth source, which is responsive via the connection at the output terminal 174 and via a rate and amplitude sensing network 176 to adjust the voltage of capacitor 164 and thereby the control voltage on FET 162. The network 176 is formed of the parallel combination of capacitor 178 and resistor 180 in series with the resistor 182, with the junction 184 of those impedances serving as the input to the feedback amplifier 172. The capacitor 178 provides the rate sensing response (the zero-crossing rate in the sampled a-c) and resistor 180 serves for the instantaneous amplitude sensing at the positive peak (and the principal AGC control) with resistor 182 providing the desired ratio impedance.

In steady state operation, the voltage (line W) on the integrating capacitor 164, at terminal 163, slowly charges through the bleed impedance 170. At the positive-going portions of each successive cycle of the a-c signal, the feedback amplifier 172 conducts (line V) with those portions of the cycle, and is effective to discharge the capacitor 164. The cascaded transistors of the feedback amplifier 172 have a threshold (e.g., about 1.5 volts) which is set by the base emitter paths of the cascaded transistors. This amplifier is gated as a function of the amplitude and rate of change of the standardized a-c voltage. The capacitor voltage controls the FET 162 via the overvoltage breakdown current-limiter resistor 165. This feedback operation is especially effective during the first few cycles of the sampled a-c signal following the keying pulse 95 that initiated the sample. These first few cycles in the standardized a-c of the sample tend to overshoot as shown in the waveform diagram (line U) and the feedback amplifier 172 sensing this overshoot is effective to reduce the capacitor voltage at terminal 163 and thereby increase the attenuation of the a-c control signal of the sample that is fed to the output terminal 174.

The operational amplifier 152 is connected with a feedback network that includes resistor 153 that is designated for low d-c gain for stability, a zener diode clipper 155 to prevent saturation of the operational amplifier, a band-pass limiter capacitor 157, and a series resistor-capacitor combination 159 to ground, designed to provide high a-c gain in amplifier 152. A potentiometer 161, connected via a resistor to signal line 157 from the attenuator to the operational amplifier, provides an adjustment for nulling any offset in the input voltage to eliminate d-c errors.

The AGC output 174 is connected through a buffer impedance 185 to the limiter circuit 98, which circuit includes a diode 186 connected to a positive voltage potentiometer 187 that provides the positive limiting control, and a diode 188 connected to a negative voltage potentiometer 189 that provides the negative voltage limiting control. The limiter circuits operate to prevent initial surges from producing faulty signals in the succeeding band-pass filters 104 that receive this a-c signal. The output on line 99 is the sampled a-c control signal with standardized amplitude levels.

Figure 8:
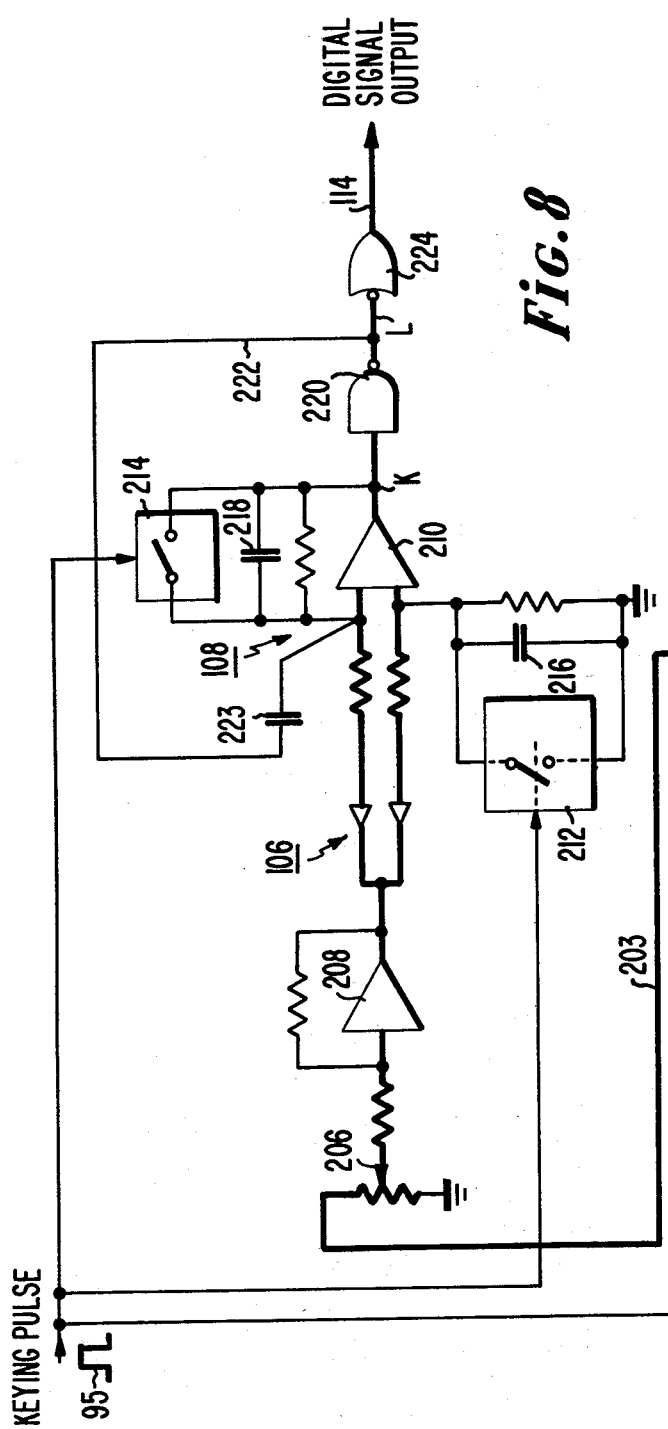
FIG. 8 is a schematic of another portion of the a-c signal detector of FIG. 3.

Each of the individual channels 100–102 for determining the frequencies of the sampled a-c signals is shown by the representative circuit diagram of FIG. 8. The band-pass filter 104, which is the initial circuit of each channel, is composed of a cascaded series of operational amplifiers 190, 192, 194, that have the desired resistive and capacitive characteristics, together with an outside feedback loop 196, from the last such operational amplifier 194 back to the negative input of the first 190, which determines the basic frequency of the filter. An adjustable resistive network 198 in that feedback loop 196 provides the loop gain trimming network. A Q loop 195, including resistors 193, from the output terminal 197 connects back to the positive input of amplifier 190, and a Q determining resistor 199 connects the latter input to ground. Electronic relays 200, 202 have their switches 201 connected across the capacitors 204 of the operational amplifiers 192, 194. These relays 200, 202 are operated by the initializing keying pulse 95 to close the switches 201 and thereby discharge capacitors 204, which action initializes by discharging these filters rapidly under control of the keying pulse during the initial period of each cycle of sampling.

The sampled a-c signal path 203 following the operational amplifier 192 is connected to an adjustable voltage divider 206, to provide an adjustment for threshold-crossing in the threshold detector, which adjusts for voltage variations in the gating and other circuits. The main signal path continues, via an operational amplifier 206 that serves as a buffer amplifier and provides appropriate gain for the signal, to the full wave rectifier circuit 106 to a low-pass filter that includes operational amplifier 210. Two electronic relays 212, 214 are connected across filter capacitors 216, 218, and also serve to rapidly discharge those capacitors during the initializing portion of each sampling cycle. A fixed threshold detector 220 (in the form of a digital NAND gate) is operated between two binary states corresponding to the threshold levels that are set and thereby generates a digital signal which assumes either one of two levels depending upon whether the rectified a-c signal is of one amplitude or another corresponding to a substantial level of energy of the basic frequency of the input band-pass filter 104. The output of the threshold detector 220 is connected via a feedback loop 222, including capacitor 223, to the input of amplifer 210, which loop accommodates for a-c hysteresis, and ensures a stable digital output once the threshold is reached. The feedback loop 222 provides positive a-c feedback, and this path functions when the threshold detector 220 operates in response to a signal above that threshold. Thus, under circumstances when the rectified signal representative of the sampled a-c is a slowly rising one, the tendency for hunting around that threshold is eliminated since the positive action of the feedback loop is to provide substantial hysteresis for momentary signal variations. However, the a-c feedback decays as the capacitor is charged so that the hysteresis has also diminished at a later time when the signal recrosses the threshold. Accordingly, both thresholds are then substantially the same, and substantially no hysteresis occurs for the mean signal path. The detector output is also connected via a digital line-driving circuit 224 to the digital signal output line 114 (for the first channel shown in FIG. 3, and similarly to lines 115, 116 for the other channels).

Figure 9:
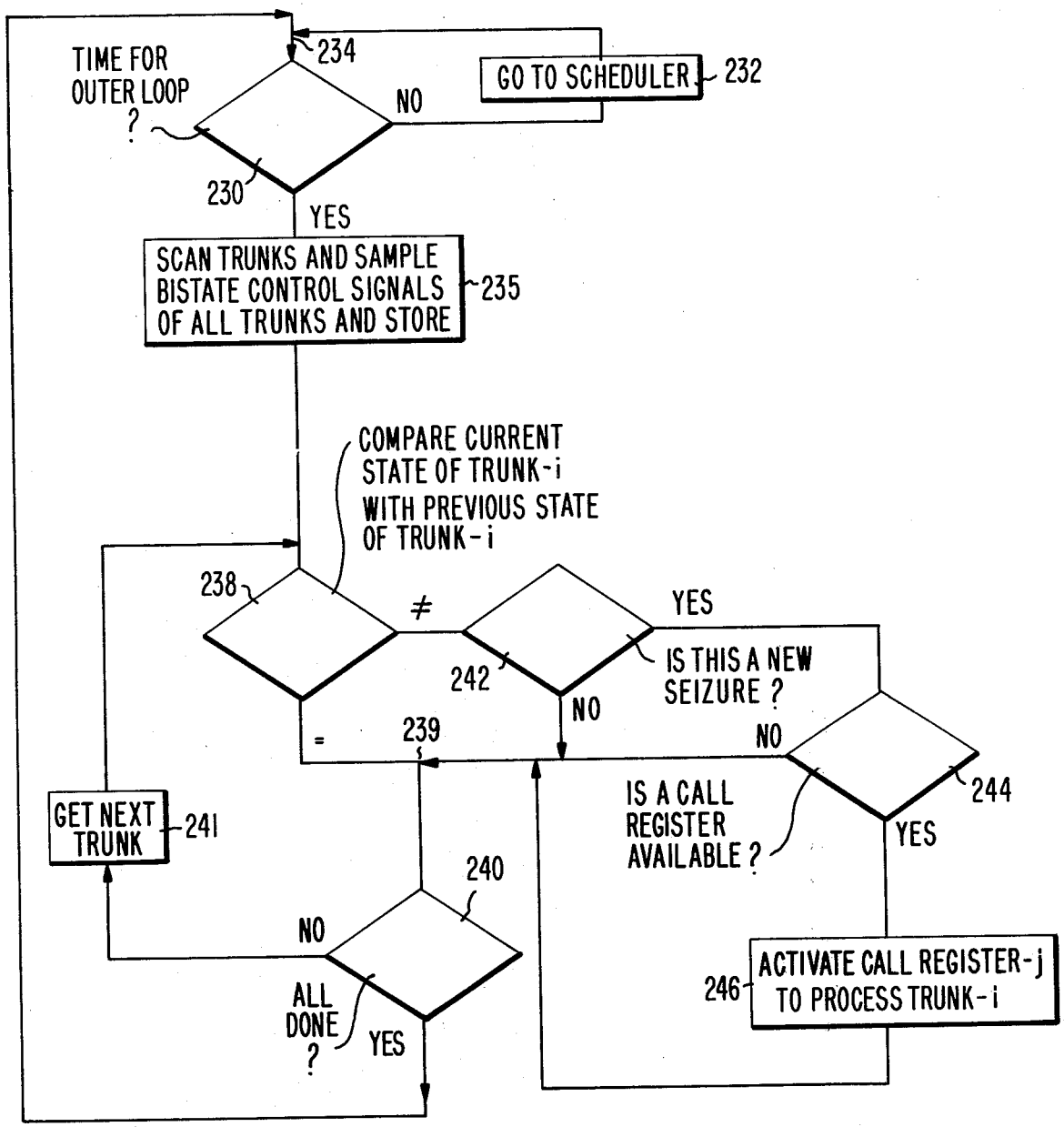
FIG. 9 is a schematic block and flow diagram of a portion of the interpreter of FIG. 1.
Figure 10:
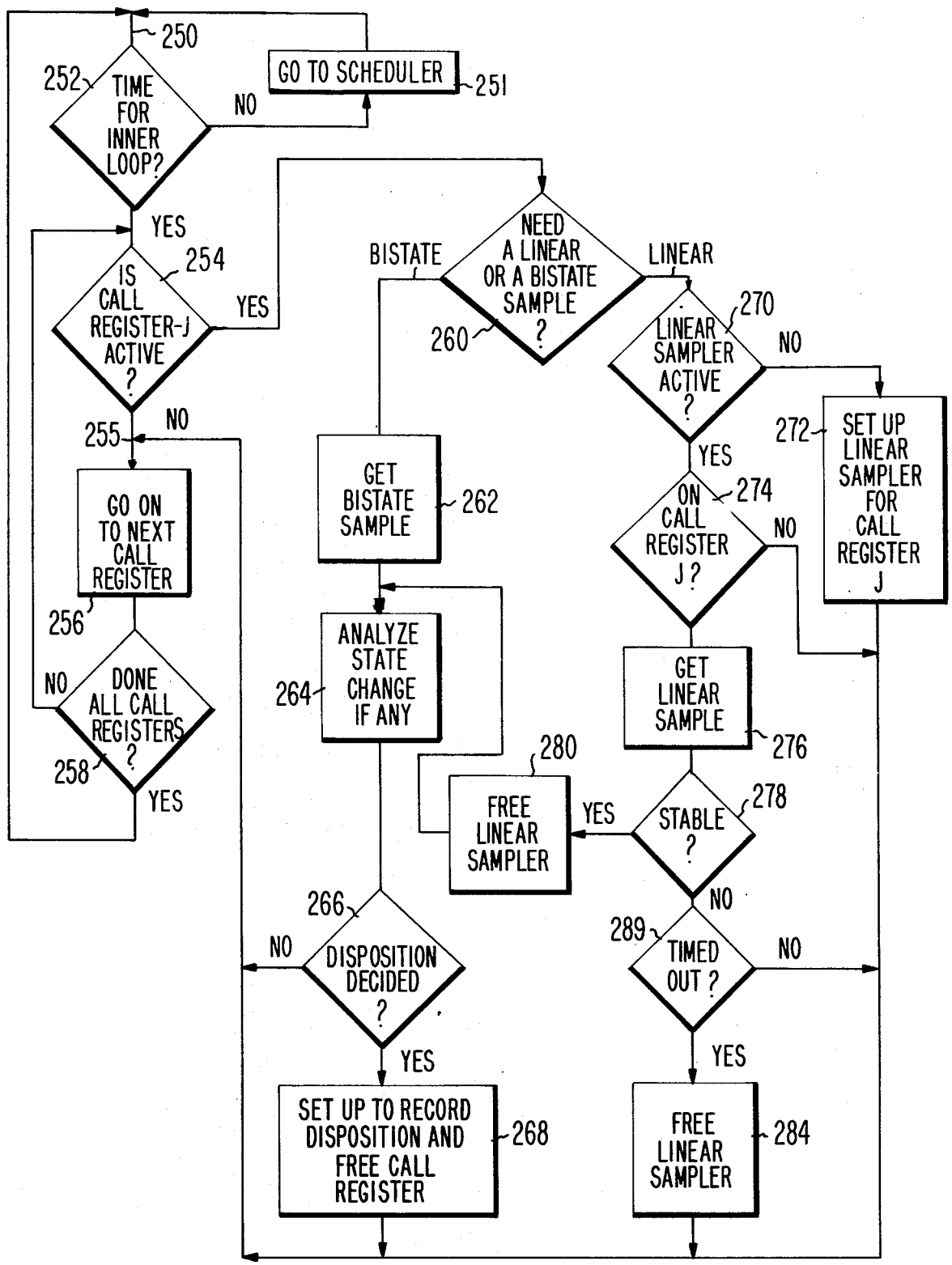
FIG. 10 is a schematic block and flow diagram of another portion of the interpreter of FIG. 1.

The overall operation of the interpreter 38 (processor 76, FIG. 2) for the sampling control unit 24 is shown in FIGS. 9 and 10, which represent flow charts of the controls that direct the interpreter operation. In FIG. 9, the outer loop of the system is represented, which is concerned with the macroscopic decisions relating to the selection of trunk circuits whose signals are to be sampled. This outer loop tracks the bistate control signals (on the sleeve lines in the illustrative embodiment) of all the trunks and looks for and detects transitions in those states. When a state transition indicates the start of a new call, the outer loop of FIG. 9 operates to set up the inner loop of FIG. 10, which, in turn, tracks the particular call to determine the disposition of that call, e.g., whether completed or not and with variations on that question depending upon the amount of information that is required by the user of this system.

In testing for bistate control signals, these states may be determined either from the bistate leads such as the sleeves or E and M leads or they may be determined directly from the T and R leads which may also carry the bistate control signals as well as the linear signals.

The interpreter control and processing operations are described with respect to two control loops, illustrated in the flow charts of FIGS. 9 and 10. The outer loop, FIG. 9, is periodically rescheduled for operation at fixed time intervals, which are pre-set depending upon the particular application and contect in which the system is applied. An initial decision 230 of the outer loop determines from the pre-set parameters of the system whether it is time for operation of the outer loop. This operation is essentially determining whether the current time as measured by the clock of the interpreter 38 is registering an interval corresponding to that of the pre-set conditions in which the outer loop operates. If it is not time, the exit from this decision 230 is via the control path 232 to the scheduler and a return to the entry point 234 to await the next periodic testing of the time by decision 230. The scheduler is a control routine of the interpreter that coordinates the operation of the two loops.

When it is the proper time for operation of the outer loop, the operation proceeds with the processing 235 to scan all of the trunks 12, 14, 16 and sample the bistate control signals thereof. This operation directs the generation of the successive addresses by generator 78 to open the gates 84 and pass the sleeve signals to the processor 76. Since these addresses are also designated (trunk state registers 38) storage areas for digital signals, the sleeve signals can be passed directly to those registers of the processor; for example, in groups of eight signals for eight sleeves, and successively for each group of eight sleeves. The states of all the trunks may be determined, depending on the type of telephone circuit from the bistate leads, the linear signal pairs, or from a combination of both. These signals are stored in the trunk state registers 38 which, among other items, contain the following data for each register: The Trunk Number; Previous Bistate Signal; Current Bistate Signal; Lapsed Time in Current Bistate; Seized or Not.

Thereafter, decision 238 compares the state of the bistate control signals of each trunk-i obtained from the current sampling with the state of those signals obtained from the previous sampling. If they are the same, the indication is that there has been no change in state of trunk-i. This process is performed then for each succeeding trunk, and so on, with the control path being via a decision 240 which determines whether all of the circuits have been tested, and, if not, the next trunk is gotten 241 and the comparison 238 performed on it. When test 240 indicates that all of the trunks have been so tested, the exit is back to the starting point 234 to await the next time for this scanning operation to be initiated. If the current state has been changed from the previous state, test 242 then determines whether or not this represents a new seizure, such as by reason of the signal change being from on-hook to off-hook. If the reverse transition took place, so that it is not a new seizure, then this operation terminates by way of a return to decision 240, to perform the remainder of the processing as described above. If the off-hook is not a change in state, a determination is made of the length of time the state has been "off-hook" to determine if a stable stated has been registered, and, if so, the register state is identified as "seized" for that trunk.

If the change in the state of the trunk represents a new seizure of that trunk, then the path of control is to decision 244, which then determines the whether one of the limited number of call registers 39 is available. This determination is made by access to the call registers which keep track of the trunk circuits whose linear control signals are being sampled. If no call register 39 is available for handling the new call so that progress on the trunk for that call cannot be directly followed, decision 244 returns the flow of control to point 239 and the next circuit is tested in turn. If a call register is available, then the process 246 actuates the next available one to sample the linear signals of trunk-i and sets up the controls for the inner loop to proceed with the processing of that trunk upon completion of the outer loop.

The return of the processing again is to point 239 of this outer loop flow control. When all of the circuits have been scanned for their bistate control signals, the outer loop control is returned to its initial point of entry 234 to await the next periodic check to determine whether it is time for the outer loop to operate.

The inner loop, FIG. 10, makes the microscopic decisions as to what is happening to the calls on the trunk circuits that have been detected by the outer loop and set up for more detailed control-signal sampling and analysis. The inner loop arranges for samples from both the linear signal sampler and the bistate sampler and determines all states of the lines being followed, and also makes decisions regarding the dispositions of the calls, depending upon the particular application of the system. The inner loop operates at pre-set times and is periodically scheduled for its operation; from the entry point 250 the decision 252 is periodically initiated to determine whether it is time for the inner loop to operate. If it is not time, the control returns via path 251 to the scheduler and to entry point 250 to await the next initiation of the inner loop operation. When the proper time for inner loop operation occurs, a set of tests 254 is made for each call register 39 to determine from its "call state" if it is currently idle or active.

The data items stored in each call register include the following:

Call State Indicator — used to indicate the state of the call contained in this Call Register. The call can be in one of five possible states, as follows:

Idle — the register is available. No call is stored in the register.

Dialing — The call is presently in the dialing state.

Dialing Completed — Dialing has been completed Audible signals are being decoded to determine disposition of the call.

Disposition Determined — The disposition of the call has been determined, and no new sampling is being done. It is ready for disposition recording.

Disposition Recording — The interpreter is in the process of recording the disposition of the call. The register will go to the idle state when the disposition is fully recorded.

Disposition Code — Once the disposition has been determined, the disposition of the call is indicated by a code stored in this field of the call register. A numerical value is associated with each possible disposition.

Trunk Number — this field records the circuit number corresponding to the circuit being analyzed by this call register.

Present Reading (PR) — This field records the present reading from the processor. This reading will not be processed further, however, until it changes to a new reading.

Processing Routine — This field stores a pointer to the processing routine to be performed when the present reading is terminated by a new reading.

Start Time of Present Reading — This records the time at which the present reading started. When the present reading is terminated by a new reading, the time difference will indicate the duration of the present reading.

Call Timer — This field records the time at which the call started. At the end of the call, it is used to record the length of the call.

Total Number of Readings after "ST" — This field records the total number of valid readings taken after "ST".

Number of Readings with Audio — This field is used to record the number of readings in which some audio energy was detected.

Time of End of Last Ring or Ring Gap — This field records the time at which the last ring signal or inter-ring gap ended.

Battery Polarity at End of Dialing — This indicates the polarity of the battery (d-c control signal) at the time that end of dialing was detected.

Battery Reversal Flag — This flag indicates that a battery (d-c control) polarity reversal has been detected and that the call may be about to be completed. It is used in conjunction with the next field to determine the completion of a call Time of Last Battery Reversal — This field records the time at which the last battery reversal started. If this condition persists for a sufficiently long time, the call will be considered complete.

Number of Rings — This field contains a count of the number of inter-ring gaps detected during the call.

Number of Busy Signals or Gaps — This field contains a running count of the number of busy signals or gaps between busy signals detected during the call.

Number of Reorder Signals or Gaps — This field contains a running count of the number of reorder signals or gaps between reorder signals detected during the call.

Time of First Busy or Reorder Signal — This field contains the time at which the first busy or reorder signal was detected.

Unloaded Line Flag — This field contains a flag which indicates that the unloaded line condition has been detected. In conjunction with the following field it is used to detect the existence of the unloaded line condition.

Time of Start of Unloaded Line Condition — This field contains the time at which the unloaded line condition started. If it persists for a sufficient length of time, the disposition of the call will be considered to be that for an unloaded line (recorded message).

Count of Dialed Digits — This field contains the number of dialed digits (either MF or dial pulse) detected during the dialing portion of the call.

Dialed Digits — This field contains the actual digits (multifrequency or dial pulse) decoded during the dialing portion of the call.

If the initial call register that is tested is idle, the next call register is processed until all the call registers are done. The process of control to run through successive call registers is via decision 254, process 256 to go on to the next call register, decision 258 to determine if all of the call registers have been processed, and if not, control returns to decision 254 to continue the processing with the next call register. When all of the call registers have been processed, the exit is back to entry point 250 to await the next time for the inner loop operation.

If any call register is active, decision 260 determines whether a linear or a bistate sample is needed. This decision 260 is based upon a series of tests of the status of the call register, together with a set of control procedures which direct that in the various possible states of an existing call, further testing of one of the other samples, bistate or linear, is required. Examples of such control procedures are set forth above and other examples will be further apparent to those skilled in the art from the following description. If a bistate sample is required, process 262 obtains this sample immediately from the bistate sampler, process 264 analyzes any change in the current state from the previous state and stores those changes in the call register fields set aside therefor. Next, decision 266 determines whether this change in state indicates that the disposition has been decided. (For example, by a stable return of the bistate signal to on-hook from off-hook indicating termination of the call).

If the disposition has not been decided, return of control is to point 255 in the flow path to go on to the next call register. If the disposition has been decided, a record of the disposition is set up (e.g., by a tape recording or the like for later or immediate printout, and that call register is freed and its registered position cleared, and control for the flow returns to point 255. If decision 260 indicates that a linear sample is required for that particular trunk, decision 270 thereafter determines whether the linear sampler is active. Unlike the bistate sampler, which operates essentially instantaneously since any changes in those signals are rapid ones, the linear sampler 20 takes appreciable time to operate. For several cycles of an audio signal may be required in order to obtain a sufficiently stable indication of the state of the linear signals of the trunk. Thus, it is necessary to determine 270 initially whether the linear sample is active for a different call register. If the linear sampler 20 is not active, it is then set up 272 to operate on the particular trunk for which call register-j is operating, and control returns to point 255 to go on to the next call register.

If the linear sampler is currently active, decision 274 determines whether it is active for the purpose of call register-j, and, if not, then control again returns to point 255. If it is operating for call register-j, process 276 directs the sampling of the linear signals so that the representative states of the call on the particular trunk can be obtained. Thereafter, tests 278 compare the presently obtained sample readings with the past linear samples to see if they are stable. Stability criteria require that the samples incorporate two consecutive valid readings. A valid reading is one consistent with normal telephone circuit operation; for example, that the call address signals be two multifrequency signals concurrently and that address signals have the prescribed format. If the linear samples are stable, the linear sampler is then freed 280 to permit the next call register to use it. Thereafter, control shifts to process 264 to determine if there is a change in state from the previous states that were registered, and tests 266 determine the disposition if that is possible. If test 278 indicates that the linear control signals that have been sampled are not yet stable, test 289 determines if the pre-set maximum time for obtaining a stable sample has been reached. If it is, then the attempt to get a linear sample is terminated for that cycle, and the process 284 frees the linear sampler and control returns to point 255. If it is not yet timed out, the linear sampler is permitted to go forward with its operation and control is transferred to point 255 to go on with processing the next call register.

Figure 11:
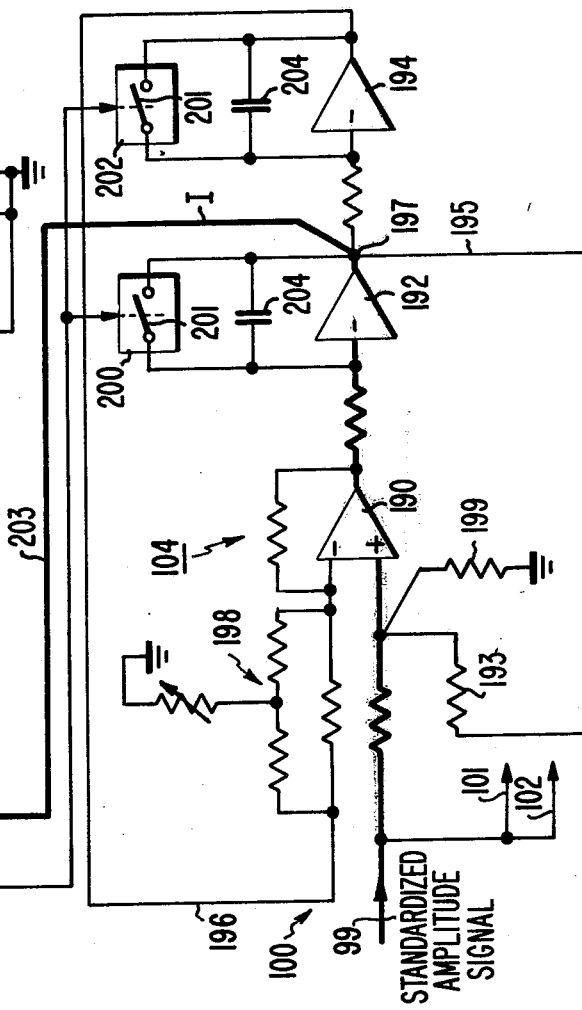
FIG. 11 is an idealized timing diagram illustrative of the operation of the portion of the control unit shown in FIG. 10.

When call register-j is active, and test 270 indicates that linear sampler 20 is not active, process 272 sends the sampler the address of the T/R pair for the trunk assigned to call register -j. An active flag is set indicate which call register the sampler is assigned to. In the timing diagram of FIG. 11, this is initiallly assumed to be call register-1 (CR-1), as indicated by the first long arrow. Thereafter, control returns to point 255. Sometime thereafter, this loop again runs through test 254 for CR-1 and determines (via tests 260, 270, 274) that the linear sampler is active on CR-1, whereupon process 276 obtains the sample for CR-1 as indicated by the active flag. Thereafter the sample is checked 278 to determine if it is stable and valid and the disposition determined 264 and 266, if possible. This sample is indicated by the first short arrow from the left in FIG. 11. This loop operation repeates successively, illustratively about every 1 ms interval (as indicated by the series of short arrows) until a stable and valid sample is obtained to complete the sampling cycle. If it is not obtained within a suitable time (e.g., about 20 ms), the sampling cycle is timed out 289 and the sampler freed 284. Thereafter, the above-described operation repeats, and if CR-2 is active, process 272 sets up its trunk's address in the sampler, and the successive samples are obtained over a sampling cycle in the manner described above. Thereafter, the trunk address CR-1 is again sent to the linear sampler, and so on, with the sampling cycle of one call register alternating with that of the other, as indicated in FIG. 11. Under certain conditions, as where only CR-1 is active, its address would be sent for repeated sampling cycles. The test 260 determines which sample to obtain, bistate or linear, in accordance with logical procedures that depend on the current state of development of the call and the alternative signal types that then could occur and should be examined. For example, in E and M telephone circuits, those lines carry the dialing signals, Therefore, when such a circuit reaches the dialing stage of a call, its call register provides the information for test 260 to sample the E and M leads every 5 ms for the dial pulses. The repetition rate of the sampling is varied depending upon the state of development of the call in progress. For example, the MF tones call for more frequent sampling; while following detection of ST, the repetition rate of the sampling is reduced to a scan rate sufficient for the detection of audible ringing to identify the onset of busy or reorder signaling. Thus, with the detection of low tone signaling, the sampling rate can be reduced to a medium speed. If the audible ringing is detected and maintains sufficiently long, the scanning rate shifts to a low speed sufficient to gather information to discriminate between ringing and no-ringing.

In one particular embodiment, the time for completing the inner loop processing and obtaining each sample is generally less than 1 ms (a linear sample time may range from about 50 to 300 microseconds), and the inner loop cycle is generally restarted about every 1 ms. The outer loop, is repeated for each trunk (taken in groups of some or all about every 50 milliseconds, and its processng time is the order of 100 microseconds. Thus, the outer loop cycle is generally performed after a larger number of inner loop cycles, for the bistate samples tend to change less frequently, and stable samples are more readily obtained. With this arrangement all of the calls can be detected and a good part of the calls can be sampled and analyzed in detail. In an application for monitoring 32 trunks, it has been found possible with two call registers to monitor the dispositions of about 60% of the calls in the busiest part of the day; and for 64 trunks, about 40% of such calls. With a larger number of call registers, a larger percentage of the calls can be fully monitored. In addition, the sampling of a larger percentage of concurrent calls can be achieved by sampling techniques other than that of the time division multiplexing described above. For example, slower portions of the detecting circuitry may be duplicated so that the duplicate portions are processing samples from different trunks. By increasing the detecting circuits, the number of call registers can be similarly increased. Also, sample and hold circuits may be used for increasing the effective sampling and monitoring of calls. For example, with a plurality of sample and hold gates, each effective to sample a trunk line at the order of microseconds and to hold the sample for the order of milliseconds, a larger number of call registers can be employed in the manner described above to monitor a large percentage of the calls.

The call disposition process in the analysis 264 and tests 266 of the inner loop have a set of control mechanisms. The following illustrative controls for determining the call disposition have been found suitable for most situations.

Complete Disposition—CMPL is the designation for the detection of answer supervison on a circuit. There is no requirement that ringing or any other signal be detected on the circuit prior to the answer supervision, nor that a specific length of time has passed following the end of dialing. The rule for loop-signaling (tip/ring/sleeve) circuits is as follows: During dialing (for MF-upon detection of ST; for DP-upon detection of the first on-hook), the polarity between tip and ring is determined. After this time, the controls are set to look for a reversal in the battery polarity. If such a reversal persists for a period of 1.25 seconds without being re-reversed, the disposition is determined as CMPL. Note that if seizure is lost before the 1.25 second interval is up, the call will not be called CMPL; seizure must be maintained during that entire interval and must continue to be maintained when the disposition is determined. For E and M signaling, the rule is slightly different: Whichever of the two signaling leads —E or M— was seized to initiate the call, the other lead is examined to determine answer supervision. As with loop-signaling, answer supervision must be maintained for 1.25 seconds for the disposition to be determined as CMPL. If seizure is lost more than momentarily during this 1.25 second interval, the disposition will not be called CMPL.

Recorded Message Disposition—REC is the designation for detection of a condition in which talking battery is removed from the line. Note that this disposition is only relevant for loop-signaling; talking battery conditions are not relevant in E and M signaling situations. This determination may not necessarily be positive indication of a recorded message; reorder in some tandem offices is also wired to remove talking battery, and would therefore be called REC under this procedure. The following control process is used: If the absolute value of the tip-ring differential voltage is less than 3 volts after dialing is complete, and stays that way for a period of 1 second, then the disposition REC is determined. Note that in this case, a battery polarity reversal (if any) is ignored. If seizure is lost during the time when talking battery has been removed, and before the time the disposition is made, the disposition will not be called REC.

No Ring—No Answer Disposition—NRNA is the disposition given when it determines that the overall voice frequency (VF) level on a call is very low. Note that this is a "judgment" decision: If there is no ringing or busy on the call, but there is conversation by the originating party, the call might not be called NRNA in spite of the absence of ringing or busy. The control process is as follows: From the end of dialing to the loss of seizure, the equipment determines the percentage of time in which a substantial energy level is detected in the band of 300–700 Hz. If, during this entire interval, such energy level is detected less than 7% of the time, the call is called NRNA. If the length of the call following the end of dialing is less than 12 seconds, the disposition will be ABAN, as this is considered to be the minimum period a person should wait to hear an audible response. Thus, any NRNA disposition will have a "length of call" of 12 seconds or greater.

Don't Answer Disposition—DA is the disposition for detection of ringing followed by the loss of seizure without answer supervision. As the equipment determines dispositions by means of detecting patterns in the VF energy level on the line, it should be noted that subscriber conversation on the line while ringing is in progress can distort this disposition. The ringing signal, in one case, is defined, as follows: During the ON cycle, the amplitude of the VF signal shall be between $-38$ and $-16$ dBM with at least half of the VF energy lying in the range of 300–700 Hz. The ON cycle shall have a period of $2.0 \pm 0.5$ seconds. During the OFF cycle, the amplitude of the VF signal in the 300 to 700 Hz range shall be less than $-40$ dBM. The OFF cycle shall have a period of 4.0 ± 1 seconds. The control process for DA is as follows: Following the end of dialing, the VF energy pattern is decoded to determine whether the ringing signal is present. If so, and if the total length of the call following the end of dialing is less tha eight seconds, the disposition will be ABAN. If the length is greater than eight seconds, and the number of ringing signals detected is consistent with the length of the call, and the ringing signal was detected within the last seven seconds of the call, then the DA disposition will be given.

Abandoned Disposition—ABAN is the disposition given to indicate a short DA or NRNA. Note that it can also occur on short busy's or RO's when the number of busy or re-order cycles prior to hangup is not sufficient to solidly detect the busy or re-order dispositions. The control process is as follows: If voice energy is detected, and the call length is less than eight seconds, the disposition is ABAN. If voice energy is not detected, and the call is not more than 12 seconds long, the disposition will also be ABAN.

Busy Disposition—BUSY is the disposition for the detection of the busy signal, which is defined as follows: During the ON cycle, the amplitude of the VF signal shall be between −38 and −16 dBM, with at least half of the VF energy lying in the range of 300–700 Hz. The ON cycle shall have a period of 500 ± 100 ms. During the OFF cycle, the amplitude of the VF signal in the range of 300–700 Hz shall be less than −'dBM. The OFF cycle shall have a period of 500 ± 100 ms. The control process is as follows: Following the end of dialing, a busy signal conforming to the above specification shall be present from the onset of the detection of the busy signal until the loss of seizure. If less than two cycles of the busy signals are detected, and the call is short, the disposition is likely to be ABAN, since not enough data has been collected to provide an unambiguous detection.

Reorder Disposition—RO is the disposition for the detection of the reorder signal, which is defined as follows: During the ON cycle, the amplitude of the VF signal, at least one-half of which must lie in the range of 300–700 Hz, shall be between −38 and −16 dBM. The period of th ON cycle shall be 250 ± 100 ms. During the OFF cycle, the amplitude of the VF signal within the range of 300–700 Hz shall be less than −40 dBM. The OFF cycle shall have a period of 250 ± 100 ms. The rule for determining reorder is similar to the rule for determining BUSY, i.e., a short reorder can turn into ABAN.

No-Supervision Disposition—The NS disposition is given to indicate the detection of ringing followed by the absence of ringing. The control process is as follows: Following the end of dialing, ringing is detected as described above for DA. If, unlike DA, no ringing is detected within the 7 seconds prior to the loss of seizure, the disposition will be NS. If no clear ringing pattern has been detected at all, the disposition will be ND. If the length of the call is less than 12 seconds, the disposition will be ABAN. Note that a consequence of the above rule is that an intercepted call without ringing will not be called NS, but ND. Ringing must be detected in order for the call to be given the NS disposition.

No-Decision Disposition—ND is the disposition given when the equipment cannot determine what disposition to otherwise use. It is most commonly given for calls in which the ringing, busy, or reorder signals do not conform in some particular to the specifications given above. It is especially likely if the pattern of ringing, busy, or reorder fails to confrom to the specifications. It can also occur on a noisy circuit where calls are distorted, or can be due to the subscriber conversation distorting a ringing, busy, or reorder pattern. It is explicity given as the disposition for a call which would otherwise be called NS except that no ringing has been detected.

The operation of the system may be viewed as one in which the equipment continually refines its decision as to the disposition of a call. This is a process of continually narrowing the possible dispositions, eliminating certain dispostions as the call proceeds, until there is only one disposition left. At this point, further analysis of the call is suspended and the time used by that call is made available to the next. Should seizure be lost, and no unambiguous disposition has yet been determined, then the call has an ambiguous or no-decision disposition, and is so reported. A number of alternative approaches may be used in the disposition analysis and with experience derived from the use of this equipment, modifications may be developed. The construction of the equipment is particularly adapted to such refinements. The following summarizes one set of procedures for the disposition analysis: There are a number of different ways in which a call's disposition can be that of an MF failure. This includes no KP, no ST, or an invalid number of digits in the call. Even though the call may suffer from one of these defects, however, a further attempt may be made to determine the disposition of the call, as it is possible that the MF receiving equipment decoded the call correctly even though this monitoring equipment did not; this may particularly be true of very-low-level MF signals. Following ST, the system scans looking for low-tone, audible ring, or answer supervision. If it fails to find any of the three unambiguously, the scanning of the call is continued until seizure is lost (or until a 1 minute timeout, if that time can be given). In either case, the disposition is recorded as No ring/No answer (NRNA) and the number of seconds from ST to loss of seizure is also recorded. This can be any one of a number of real dispositions. For very short calls, the sender may have decided to re-try; for slightly longer calls, the caller may have abandoned the call without waiting to hear the ringing signal. The equipment may be designed to permit the user to specifiy the call lengths which distinguish between these cases. Whether or not ringing has been detected following ST, the detection of answer supervision always is interpreted as a completed call. The time from ST to answer supervision is recorded. At certain tandems, when a recorded message is put on a circuit, a characteristic floating condition exists, in which tip and ring are at nearly the same potential. This condition is detected by the equipment, and reported as a recorded message.

Following the detection of the audible ringing signal (440/480 Hz), and unless either (1) low tone is detected, indicating busy or reorder, or (2) supervision is detected, indicating a completed call, the disposition must be either no-answer, no charge, or an ambiguity between them.

The state of the line is sampled sufficiently often to detect the ringing signal. Periodically a pattern-matching technique is used to determine whether the ringing pattern is present in the signal. This process is terminated when either seizure is lost, or the call is timed out. If, at this time, the ringing pattern is detected unambiguously for a number of seconds (e.g., two ringing cycles), the disposition is no-answer (NA). If this is unambiguously not detected, the disposition is no-charge (NC). Finally, if no decision can be made, it is given an ambiguous disposition. Following the unambiguous onset of low tone, the possible dispositions are busy, reorder or ambiguous between them. Low tone can start either following ST or following the onset of audible ringing. Once a sufficient period of samples have been taken, the equipment attempts to determine the existence of a busy or reorder pattern in the sample. If either pattern is unambiguously detected, this is taken as the disposition, and further analysis is terminated. If the pattern cannot be detected unambiguously, then additional samples may be taken and the analysis process repeated. If the call times out, or seizure is lost, without an unambiguous busy or reorder pattern, then the disposition is ambiguous.

In the operation of the system, the sampling of the bistate and linear signals is for the purpose of identifying the control state of the telephone circuit at each sampling period. These signals that are sampled are in some cases internal control signals that initiate automatic activity in the telephone circuits such as the seizure signals, dial pulse or MF tones. In other cases, the signals are communications to a human operator (e.g., ringing, busy or reorder) and more in the nature of information signals that represent a certain control state of the telephone circuit and of the progress of a particular telephone call from its beginning to disposition. Thus, the terms "control signals" and "call-state signals" are used interchangeably herein to identify the telephone circuit signals that are detected in the sampling operation.

Various other modifications of this invention will be apparent to those skilled in the art from the above description, which is presented as illustrative and not limiting. The appended claims are intended to cover such modifications as are encompassed by the scope and spirit of the invention. For example, the interpreter portion of this invention in a preferred embodiment is constructed in the form of a general-purpose computer with a stored computer program of the type set forth in the following appendix. This embodiment is desirable from the standpoint of ease of enhancement of modification to meet particular applications. Also, because of the complexity of the system and its size, engineering considerations determined that form of construction. From various other engineering considerations and the development of different aspects of this technology, the interpreter may be embodied, all or in part, in the form of logic circuits, and techniques for this construction, from the description herein, are known to those skilled in the art.

Thus, this invention provides a telephone circuit monitoring system for identifying the calls initiated on a large number of telephone circuits and for sampling in detail the call-state signals occurring simultaneously on a plurality of telephone circuits. This invention may be applied to determining the dispositions of the telephone calls and for other purposes as well.

What is claimed is:

1. Apparatus for monitoring signals on a plurality of telephone circuits to determine call disposition comprising:
   separate input means for connection to each of said telephone circuits and for receiving call-state signals on the associated telephone circuit;
   means responsive to different address signals respectively associated with said telephone circuits for detecting call-state signals on said input means associated with the addressed one of said telephone circuits, including means for detecting linear signal frequencies and the direct signal characteristics forming call-state signals appearing on said telephone circuits, and for producing corresponding signals representative of the detected signal frequencies and direct signal characteristics;
   and means responsive to said representative signals for directing the generation of said address signals to control the operation of said detecting means for detecting said call-state signals.

2. Apparatus for monitoring signals on a plurality of telephone circuits as recited in claim 1 wherein said means for directing the generation of said address signals is also responsive to seizure control signals on said telephone circuits.

3. Apparatus for monitoring signals on a plurality of telephone circuits as recited in claim 2 wherein said address signal generating means includes means for repeatedly directing the generation of address signals for sampling seizure control signals on said telephone circuits to identify those of said circuits having calls initiated and for repeatedly directing the generation of address signals for sampling other call-state signals on a plurality of said telephone circuits having initiated calls identified.

4. Apparatus for monitoring signals on a plurality of telephone circuits as recited in claim 1, wherein said means for detecting and for producing corresponding representative signals includes means for producing representative digital signals, and said means responsive to said representative signals includes a digital processor with a variable program control.

5. Apparatus for monitoring signals on a plurality of telephone circuits as recited in claim 3, wherein said digital processor includes a plurality of call registers each of registering signals representative of the successive call-states of a different telephone call being monitored, and means for directing the selection of the linear signal frequencies and direct signal characteristics to be detected based on the registered call-states of call being monitored.

6. Apparatus for monitoring signals on a plurality of telephone circuits comprising:
   separate input means for connection to each of said telephone circuits and for receiving call-state signals on the associated telephone circuit;
   means responsive to different address signals respectively associated with said telephone circuits for sampling call-state signals on said input means associated with the addressed one of said telephone circuits, including means for producing corresponding signals representative of the sampled call-state signals;
   and means responsive to said representative signals and also responsive to seizure control signals on said telephone circuit for directing the generation of said address signals to control the operation of said sampling means;
   said address signal generating means including means for repeatedly directing the generation of address signals for sampling seizure control signals on said telephone circuits to identify those of said circuits having calls initiated and for repeatedly directing the generation of address signals for sampling other call-state signals on some of said telephone circuits having initiated calls identified;

said means for producing signals representative of said sampled call-state signals including means for standardizing said sampled signals, and a plurality of separate means respectively responsive to a plurality of signals of different audio control frequencies associated with said telephone circuits for producing signals identifying the presence of said audio signals;

and said means responsive to said representative signals including means responsive to said audio identifying signals for identifying said call-state signals.

7. Monitoring apparatus as recited in claim 6 wherein representative signal producing means further includes means for restoring said signal standardizing means and said plurality of means for producing identifying signals to a reference condition at the beginning of a sampling operation.

8. Monitoring apparatus as recited in claim 7 wherein said means for restoring is rendered operative upon the generation of said address signals for sampling said other call-state signals.

9. Apparatus for monitoring signals on a plurality of telephone circuits as recited in claim 6, wherein said means for repeatedly directing the generation of address signals for sampling other call-state signals includes means for connecting said plurality of separate audio frequency means for producing identifying signals to receive sampled signals from a telephone circuit being monitored over a sampling period shorter than the period of said other call-state signals.

10. Apparatus for monitoring signals on a plurality of telephone circuits comprising:

separate input means for connection to each of said telephone circuits and for receiving call-state signals on the associated telephone circuit;

means responsive to different address signals respectively associated with said telephone circuits for sampling call-state signals on said input means associated with the addressed one of said telephone circuits, including means for producing corresponding signals representative of the sampled call-state signals;

and means responsive to said representative signals and also responsive to seizure control signals on said telephone circuit for directing the generation of said address signals to control the operation of said sampling means;

said address signal generating means including means for repeatedly directing the generation of address signals for sampling seizure control signals on said telephone circuits to identify those of said circuits having calls initiated and for repeatedly directing the generation of address signals for sampling other call-stage signals on some of said telephone circuits having initiated calls identified;

said means for producing signals representative of said sampled call-state signals including means for standardizing said sampled signals, and a plurality of separate means respectively responsive to a plurality of signals of different audio contol frequencies associated with said telephone circuits for producing signals identifying the presence of said audio signals;

said telephone circuits including a pair of signal lines, and said representative signal producing means including means for obtaining signals in accordance with the difference between the control signals on the pair of lines of said telephone circuits, and said signal standardizing means including means for removing direct current signals, and means for developing uniform amplitudes for the remaining alternating current signals.

11. Monitoring apparatus as recited in claim 10 wherein said plurality of audio signal identifying means each separately includes a filter circuit tuned to the associated audio control frequency, a rectifier circuit, and means for generating binary signals representative of the presence and absence of said audio signals.

12. Monitoring apparatus as recited in claim 10 wherein said means for developing uniform amplitudes for the alternating current signals includes means for variably attenuating said alternating current signals, and means responsive to the amplitude of the attenuated signals for controlling the attenuation of said attenuating means to develop a substantially uniform amplitude.

13. Monitoring apparatus as recited in claim 12 wherein said attenuation controlling means is further responsive to the rate of rise of said attenuated signals for controlling said attenuation.

14. Monitoring apparatus as recited in claim 10 wherein said means for producing signals representative of said sampled call-state signals includes means responsive to the low frequency components thereof to generate separate signals representative of the amplitude and polarity of said low frequency components.

15. The process of monitoring control signals, including seizure and other call-state signals, on a plurality of telephone circuits comprising:

repeatedly sampling the seizure control signals of the telephone circuits to detect the initiation of calls on said circuits, and upon detecting the initiation of a call on one of said telephone circuits, repeatedly and discontinuously sampling other call-state signals and said seizure control signals on said one circuit having the detected call, including varying the repetition rate of said sampling in accordance with the call-state signals that have been sampled.

16. The process of monitoring control signals on a plurality of telephone circuits as recited in claim 15, wherein the step of repeatedly and discontinuously sampling includes varying the duration of said sampling in accordance with the relation of successive samples.

17. The process of monitoring control signals on a plurality of telephone circuits as recited in claim 15, and further comprising:

repeatedly sampling the seizure control signals of said telephone circuits to detect the initiation of calls on others of said telephone circuits.

18. The telephone circuit monitoring process of claim 17, and further comprising:

upon detecting the initiation of a call on another of said telephone circuits, repeatedly sampling other call-state signals of said other circuit having a detected call.

19. The telephone circuit monitoring process of claim 18 wherein said sampling of other call-state signals alternates among a plurality of at least two circuits having detected calls.

20. The process of monitoring control signals on a plurality of telephone circuits comprising:

repeatedly sampling the seizure control signals of the telephone circuits to detect the initiation of calls on said circuits;

after detecting the initiation of a call on one of said telephone circuits, repeatedly sampling other call-state signals and said seizure control signals on said one circuit having the detected call, and repeatedly sampling the seizure control signals of said telephone circuits to detect the initiation of calls on others of said telephone circuits; and identifying the sampled call-state signals, and comparing the identified call-state signals of one sample with the call-state signals of a preceding sample to determine if they are the same, and if not the same, obtaining another sample of said call-state signals.

21. The process of monitoring control signals on a plurality of telephone circuits comprising:

repeatedly sampling the seizure control signals of the telephone circuits to detect the initiation of calls on said circuits;

after detecting the initiation of a call on one of said telephone circuits, repeatedly sampling other call-state signals and said seizure control signals on said one circuit having the detected call, and repeatedly sampling the seizure control signals of said telephone circuits to detect the initiation of calls on others of said telephone circuits; and identifying the sampled control signals, and comparing the identified control signals of said samples with a predetermined set of criteria for valid control signals to determine consistency therewith.

22. The process of monitoring control signals on a plurality of telephone circuits comprising:

repeatedly sampling the seizure control signals of the telephone circuits to detect the initiation of calls on said circuits;

after detecting the initiation of a call on one of said telephone circuits, repeatedly sampling other call-state signals and said seizure control signals on said one circuit having the detected call, and repeatedly sampling the seizure control signals of said telephone circuits to detect the initiation of calls on others of said telephone circuits; and identifying the sampled control signals, and comparing the identified control signals with a predetermined set of criteria for call dispositions to determine the disposition of said call.

23. The process of monitoring control signals on a plurality of telephone circuits comprising:

repeatedly sampling the seizure control signals of the telephone circuits to detect the initiation of calls on said circuits;

after detecting the initiation of a call on one of said telephone circuits, repeatedly sampling other call-state signals and said seizure control signals on said one circuit having the detected call, comprising the sampling of signal elements including frequencies and direct signal characteristics associated with said telephone circuits, and repeatedly sampling the seizure control signals of said telephone circuits to detect the initiation of calls on others of said telephone circuits; and registering the states of the detected call with the development thereof, and selecting the next of said call-state signal elements to be sampled based on the registered call-states of said detected call.

24. The process of monitoring control signals, including seizure and other call-state signals on a plurality of telephone circuits comprising:

repeatedly sampling the seizure control signals of the telephone circuits to detect the initiation of calls on said circuits, upon detecting the initiation of a call on one of said telephone circuits, repeatedly and discontinuously sampling other call-state signals and said seizure control signals on said one circuit having the detected call, identifying a sampled call-state signal from a plurality of discontinuous samples, and repeating the call-state signal sampling and signal identifying to identify the signals of a sequence of call-state signals, and comparing said sequence of identified signals with predetermined criteria for different sequences of call state signals to identify the sequence of sampled call-state signals.

25. The telephone circuit monitoring process of claim 24, wherein said call-state signal sampling is varied with said call-state signal sequence.

26. Apparatus for monitoring linear signals on a plurality of telephone circuits comprising:

separate input means for connection to each of said telephone circuits and for receiving call-state signals on the associated telephone circuit;

means responsive to different address signals respectively associated with said telephone circuits for sampling and detecting call-state signals on said input means associated with the addressed one of said telephone circuits, including:

means for standardizing said sampled signals, a plurality of separate means respectively responsive to a plurality of signals of different audio control frequencies associated with said telephone circuits for producing signals identifying said audio signals, and means for restoring said standardizing means and said plurality of means for producing identifying signals to a reference condition at the beginning of a sampling operation.

* * * * *